United States Patent
Schimmel et al.

(10) Patent No.: US 7,810,382 B2
(45) Date of Patent: Oct. 12, 2010

(54) METHOD AND DEVICE FOR DETERMINING MATERIAL PROPERTIES

(75) Inventors: Thomas Schimmel, Karlsruhe (DE); Matthias Müller, Karlsruhe (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 389 days.

(21) Appl. No.: 11/883,900

(22) PCT Filed: Feb. 10, 2006

(86) PCT No.: PCT/IB2006/000274

§ 371 (c)(1), (2), (4) Date: Aug. 7, 2007

(87) PCT Pub. No.: WO2006/097800

PCT Pub. Date: Sep. 21, 2006

(65) Prior Publication Data

US 2008/0134771 A1 Jun. 12, 2008

(30) Foreign Application Priority Data

Feb. 10, 2005 (DE) .................... 10 2005 007 937

(51) Int. Cl.
G01Q 60/26 (2010.01)
G01Q 10/00 (2010.01)
G01Q 60/24 (2010.01)
G01N 19/02 (2006.01)

(52) U.S. Cl. ............... 73/105; 73/9; 850/34; 850/33; 850/1

(58) Field of Classification Search ............ 73/9, 73/105; 850/1, 5, 33–35
See application file for complete search history.

(56) References Cited

U.S. PATENT DOCUMENTS

| | | | | |
|---|---|---|---|---|
| 5,481,908 A | * | 1/1996 | Gamble | 73/105 |
| 5,503,010 A | | 4/1996 | Yamanaka | 73/105 |
| 5,804,708 A | | 9/1998 | Yamanaka et al. | 73/105 |
| 6,578,410 B1 | * | 6/2003 | Israelachvili | 73/105 |
| 7,302,833 B2 | * | 12/2007 | Sahin et al. | 73/105 |
| 7,584,653 B2 | * | 9/2009 | Su et al. | 73/105 |
| 7,607,342 B2 | * | 10/2009 | Huang et al. | 73/105 |

OTHER PUBLICATIONS

Colchero J. Et al: "Lock-In Technique for Measuring Friction on a Nanometer Scale" Applied Physics Letters, AIP, American Institute of Physics, Melville, NY, US, vol. 68, No. 20, May 13, 1996, pp. 2896-2898, XP000488343, ISSN: 0003-6951.

(Continued)

Primary Examiner—Thomas P Noland
(74) Attorney, Agent, or Firm—Collard & Roe, P.C.

(57) ABSTRACT

The invention relates to a method of determining material properties of a contact formed between a measurement tip of a microscopic probe and a sample surface of a sample material. According to the method, a distance modulation is applied for modulating a distance between a support of the microscopic probe end the sample surface in a direction essentially normal to the sample surface and wherein a normal force signal indicative of a normal force is measured and demodulated. In the method it is proposed that the material properties be determined using measurement data comprised in the demodulated normal force signal and related to a (concave) buckling deformation of the microscopic probe relative to and away from the sample surface.

22 Claims, 8 Drawing Sheets

OTHER PUBLICATIONS

Mazeran P -E et al: "Normal and lateral modulation with a scanning force microscope, an analysis: Implication in quantitative elastic and friction imaging" Tribology Letters Baltzer Netherlands, vol. 7, No. 4, 1999, pp. 199-212, XP002398003, ISSN: 1023-8883 (ISR).

Maivald P. Et al: "Using force modulation to image surface elasticities with the atomic force microscope" Nanotechnology, Institute of Physics Publishing, Bristol, GB, vol. 2, No. 2, Apr. 1, 1991, pp.103-106, XP020067191, ISSN: 0957-4484 (ISR).

International Search Report for PCT/IB2006/000274.

Written Opinion of the International Searching Authority for PCT/IB2006/000274.

* cited by examiner

METHOD AND DEVICE FOR DETERMINING MATERIAL PROPERTIES

CROSS REFERENCE TO RELATED APPLICATIONS

Applicants claim priority under 35 U.S.C. §119 of German No. 10 2005 007937.7 filed Feb. 10, 2005. Applicants also claim priority under 35 U.S.C. §365 of International Application No. PCT/IB2006/000274 filed Feb. 10, 2006. The international application under PCT article 21(2) was published in English.

BACKGROUND OF THE INVENTION

The present invention relates to a method of determining or contrasting material properties of a contact formed between a measurement tip of a microscopic probe and a sample surface of a sample material according to the preamble of appended claim 1, wherein a distance modulation is applied for modulating a distance between a support of the microscopic probe and the sample surface in a direction essentially normal to the sample surface and wherein a normal force signal is measured and demodulated.

The present invention also relates to a device for determining mechanical properties of a contact formed between a measurement tip of a microscopic probe and a sample surface of a sample material according to the preamble of appended claim 16, said device comprising:
  said microscopic probe,
  a sample stage adapted to hold said sample material,
  distance modulating means adapted to modulate a distance between said sample stage and a support of said microscopic probe,
  a force sensing means adapted to sense a normal force effective on said microscopic probe from a deformation of said microscopic probe and to provide a normal force signal indicative of said normal force,
  a control/analysing unit operatively connected with at least said distance modulating means and adapted to demodulate the normal force signal and to determine said material properties from the demodulated normal force signal.

The present invention further relates to a control/analysis unit for use in a microscopic measurement device of the above-mentioned type, e.g. an atomic force microscope, and to a computer program product.

With the growing impact of nano-technology, the need for measuring and analysis methods with spatial resolution on the nanometer scale increases, too.

For instance, using Atomic Force Microscopy (AFM) [1] allows imaging of a three-dimensional topography of sample surfaces on micrometer and nanometer scales. Employing sharp measurement tips attached to micro-fabricated probes, so-called cantilevers, which are elastically pressed onto a sample surface, in contact mode of the AFM a direct mechanical sensing of the sample surface is performed on scales ranging from 500×500 micrometers down to scales of several nanometers and atomic scale. Increasingly, it is attempted to determine further sample characteristics in a spatially resolved manner, e.g. optical, electrical and magnetic, as well as mechanical and tribological properties, e.g. friction.

Friction measurement with an AFM has two different interesting aspects. Firstly, it is possible to study the phenomenon of friction and its causes on a microscopic scale. The AFM has the advantage, that the contact between the measurement tip and the sample surface can often be regarded as an isolated point-like single-asperity contact. Secondly, friction measurement with an AFM can be used for characterising materials with high lateral resolution. In this context it may be helpful to use the friction force for contrasting and thus for laterally distinguishing different components of a sample system. In particular contrasting of regions of the sample surface with different chemical termination with a lateral resolution down to the nanometer scale is desirable. For further characterisation it is often desirable, however, to determine local tribological properties of the sample by means of quantitative measurements of the friction force.

Conventionally, lateral force microscopy (LFM) is used for friction measurement, wherein the lateral force signal is recorded during a scanning motion perpendicular to the axis of the microscopic probe (cantilever). However, calibration of the LFM signal often is problematic, thus many publications rely on non-calibrated or qualitative data. Another disadvantage of this method results from the fact that not only friction forces lead to a torsional deformation of the cantilever, but also conservative lateral forces of mostly topographical origin [2]. In order to identify or eliminate those forces, which do not depend on the scanning direction, it is necessary to analyse the LFM signal not only for one scanning direction but also for a scanning motion in the opposite direction. However, such a procedure is problematic because hysteresis effects of the scanner and drift effects can lead to image distortions. A further disadvantage of lateral force microscopy resides in the slow scanning velocity [3].

The last two problems mentioned above have been addressed by incorporating dynamical methods, wherein in addition to said scanning motion a further lateral oscillation of the relative position of the measurement tip with respect to the sample was excited and the LFM signal analysed by means of a Lock-In technique. Such methods are also referred to as Dynamic Scanning Friction Force Microscopy (DS-FFM). In this context, the lateral oscillation can be generated by moving the measurement tip [4] or by means of a lateral sample motion [5]. Excitation frequencies are chosen to lie below the resonant frequency of the cantilever in a range of typically a view kHz up to some 10 kHz. An exception is so-called Acoustic Friction Force Microscopy (AFFM), which uses higher frequencies up into the Megahertz range [6]. Said dynamical modi have the advantage of being less influenced by sample topography than conventional LFM. In addition, use of Lock-In technique results in higher signal stability [7]. A disadvantage of methods with a lateral excitation resides in the fact, that most of the AFMs commercially available today, are not equipped for lateral modulation and that an additional piezo-electric transducer has to be used for modulation purposes.

In addition, AFM can be used for a spatially resolved analysis of elastic properties of a contact formed between the measurement tip and a sample surface. An approach for measuring normal contact stiffness is provided by indentation techniques, which rely on a quasi-static variation of the distance between the probe support and the sample by exiting a normal motion of the sample, from which a deformation of the tip-sample contact in the direction normal to the sample surface is derived from the deformation of the cantilever. Besides conventional force modulation microscopy (FMM) [8] as an example for a modulated technique, analysis of force-distance curves in the contact regime and the so-called Pulsed-Force-Mode [9] as a combination of the aforementioned technique with a scanning motion have to be mentioned here. A common disadvantage of indentation techniques arises from the fact, that they are only suited for soft sample systems, such as biological systems or polymers, because the bending force constant of the cantilever should be of the same order of magnitude than the normal stiffness of the contact, hereinafter also referred to as "contact stiffness". However, if said contact stiffness lies above the bending force constant of the cantilever, the sensitivity for contact stiffness drops substantial due to the fact that deformation of the contact becomes small with respect to deformation of the cantilever.

Owing to a combination of modulation techniques and Lock-In detection, conventional FMM offers the largest reserve with respect to detection sensitivity among the above-described indentation techniques. However, conventional FMM is increasingly sensitive for friction effects on harder samples [10, 11, 12, 13]. Samples with a Young's modulus up to an order of magnitude of several GPa (e.g. polymers) can be analysed, wherein cantilevers with a bending force constant up to an order of magnitude of 100 N/m are required, which approximately corresponds to the maximum bending force constant of commercially available cantilevers [14] (a typical value for the bending force constant of contact mode cantilevers ranging from 0.01 N/m to 1 N/m). An additional disadvantage arises from the fact that high normal forces have to be chosen when using hard cantilevers because of their low detection sensitivity for normal forces [14], which results in an additional increase of the normal contact stiffness and which may result in material destruction and surface modification in particular for easy damageable sample systems. Furthermore, hard cantilevers with bending force constants of the order of the normal contact stiffness are not well suited for sensing surface topography.

A known approach to study elastic properties of harder samples involves high frequency techniques [15], such as Atomic Force Acoustic Microscopy (AFAM) [16], Ultrasonic Force Microscopy [17], and Scanning Local Acceleration Microscopy [18], wherein the modulation frequency corresponds to or lies above the first resonant frequency of the cantilever. However, these techniques share the common disadvantage of requiring additional efforts with respect to the experimental setup, for instance by requiring an additional piezo-electric actuator with suitable driving means as well as suitably fast detectors and electronics. Furthermore, the underlying physical theory is much more complicated and less manageable than in the case of low-frequency methods [14]. In addition, the aforementioned techniques also involve use of cantilevers with hard bending force constants and high normal forces up to the μN range.

A known method providing an approach to elastic sample characteristics with softer cantilevers is known as Magnetic Force Modulation Microscopy (MFMM) [19]. MFMM is a direct force modulation technique, which uses a modulated magnetic field at the free end of the cantilever for generating a magnetic force. To this end, a small magnetic particle is glued to said end of the cantilever. Alternatively, a thin magnetic film can be applied to the cantilever [12]. In contrast to conventional FMM, in the context of this technique the bending force constant of the cantilever does not have to be of the same order of magnitude as the contact stiffness in order to achieve good sensitivity for elastic properties of the tip-sample contact. However, the additional instrumental requirement must be regarded as an inherent disadvantage of said method. Furthermore, the finite magnetic force effectively limits the maximum contact stiffness suitable for investigation, such that only softer sample systems with an Young's modulus up to 10 GPa [12]) can be studied. As with conventional FMM, buckling effects due to friction are not negligible, if the contact stiffness takes on the same order of magnitude or exceeds the buckling force constant [12]. Friction effects of the above-mentioned kind are not to be expected in the context of an extension of DSFFM (Dynamic Scanning Friction Force Microscopy) for measuring lateral contact stiffness by means of a lateral modulation technique [20, 10]. Disadvantages of said method reside in an additional instrumental requirement due to lateral modulation as well as in a difficulty of calibrating the LFM signal sensitivity and modulation amplitude.

Thus, there is a need for a method and a device of the above-mentioned types, which enable comprehensive spatially resolved analyzing of local elastic and tribological properties of a sample surface while obviating the above-mentioned disadvantages of the prior art, and which can be employed to analyse said properties locally at a sample location as well as for providing a spatially resolved mapping of said properties in the form of an imaging method.

OBJECT OF THE INVENTION

It is the object of the present invention to provide a method and device of the above-mentioned types, which enable comprehensive spatially resolved determination of local elastic and tribological properties of a sample surface and which can be employed to determine said properties locally at a sample location as well as for providing a spatially resolved mapping of said properties in the form of an imaging method. It is further an object of the invention to provide a method of the above-mentioned type wherein effects of sample topography are largely excluded from the obtained friction information. In addition, it is an object of the present invention to provide a method of the above-mentioned type, which can be used over a wide range of force constants of the microscopic probe (e.g. cantilever).

SUMMARY OF THE INVENTION

According to a first aspect of the present invention, the object is achieved by providing a method of the above-mentioned type, wherein said material properties are determined using data comprised in the normal force signal and related to a buckling deformation of the microscopic probe relative to and away from the sample surface.

According to a second aspect of the present invention, the object is achieved by providing a device of the above-mentioned type, wherein said control/analysing unit is adapted to perform a method according to said first aspect of the present invention.

According to a third aspect of the present invention, the object is achieved by providing a control/analysis unit for use in operative connection with a microscopic measurement device, e.g. an atomic force microscope, said device providing a normal force signal indicative of a normal force effective on a microscopic probe when said microscopic probe is in contact with the sample surface and a distance between the sample surface and a support of the microscopic probe is being modulated, said control/analysis unit being adapted to perform the method according to said first aspect of the present invention.

According to a fourth aspect of the present invention, the object is achieved by providing a computer program product comprising program code sequences adapted to implement and/or perform the method according to said first aspect of the present invention, in particular, when executed in a control/analysing unit of the device according to said second aspect of the present invention or in a control/analysing unit according to said third aspect of the present invention.

Generally, the inventive approach, hereinafter also referred to as "VM-LD" as an acronym for "Vertical Modulation-Lateral Detection", achieves the object by modulating the distance between the probe support and the sample stage/sample surface. In embodiments of the invention, said modulation can occur non-periodically, e.g. only once, but preferably occurs in a periodic fashion periodically in a direction essentially normal to the sample surface. In the context of the present invention, not only normal forces but—decisively—also lateral forces which are effective between the measurement tip and the sample material are detected. A preferred embodiment of the invention is in connection with an AFM and/or employs a cantilever as microscopic probe. For example, for an AFM said lateral forces are effective mostly parallel to the sample surface, in particular parallel to a projection of a longitudinal axis of the microscopic probe (e.g., a cantilever) onto the sample surface. In contrast to normal forces, said lateral forces do not lead to a conventional bending of the microscopic probe but to a specific deformation, the so-called buckling deformation (i.e., a deformation with respect to and away from the sample surface), which is detected and analysed in the context of the present invention.

If a sensor in the form of a cantilever, e.g. as it is used in a Scanning Force Microscope (SFM) is applied, there are basically three types of deformations which can be distinguished:

1) A torsional deformation of the cantilever due to lateral forces (forces essentially parallel to the plane of the sample) acting on the cantilever tip perpendicular to the direction of the cantilever (or in the case of a slanted cantilever: perpendicular to the direction of the projection of the cantilever on the plane of the sample).

2) A buckling deformation of the cantilever (convex or concave) due to lateral forces acting on the cantilever tip which are essentially parallel to the direction of the cantilever (or in the case of a slanted cantilever: parallel to the direction of the projection of the cantilever on the plane of the sample).

3) A bending deformation of the cantilever resulting from normal forces (forces essentially perpendicular to the plane of the sample) applied to the cantilever tip. In this text, the sum of the contributions to the detector signal or sensor signal due to bending and due to buckling is called the normal force signal (NFS).

If the distance between the microscopic probe and the sample surface is periodically modulated at sufficiently low amplitudes, the lateral force imposed due to the resulting buckling deformation is lower than the force of sticking friction, and the cantilever or sensor tip forming the sensor-sample contact will not move relative to the sample surface. This regime of (low) modulation amplitudes where this is the case, is called the sticking regime, as the tip apex sticks to the sample surface although the said distance modulation is applied. For higher distance modulation amplitudes, the lateral force imposed due to the resulting buckling deformation is exceeding the force of sticking friction, and the tip apex will slide on the sample surface during at least part of the modulation cycle. This regime of (higher) modulation amplitudes where this is the case, is called the sliding regime, as the tip apex is sliding relative to the sample surface at least during part of the modulation cycle.

In the following, a basic idea of the VM-LD method will be described briefly with reference to a specific embodiment of the method in accordance with the present invention: In accordance with an embodiment of the invention, the distance between the support of a microscopic probe (e.g. the cantilever of an AFM) in contact with the sample material is modulated periodically and non-resonantly in a direction normal to the sample surface, as in conventional force modulation microscopy (FMM). The amplitude and/or phase of the first harmonic oscillation component of the normal force signal are recorded at the frequency of the distance modulation by means of a demodulation technique, e.g. using a Lock-In amplifier. In contrast to conventional FMM, the type of the microscopic probe and/or its orientation relative to a direction of the modulation motion as well as a modulation amplitude are chosen such that the obtained signals are decisively influenced by lateral forces. In the present context, this can be achieved by making use of the fact that owing to the modulation motion the measurement tip is not only displaced in the direction of said modulation motion, but that due to the geometry and orientation of the microscopic probe (and its elastic deformation, respectively) a lateral equilibrium position of the measurement) is displaced with respect to the sample material. In this context, said lateral equilibrium position is defined as the lateral position the tip would occupy in absence of external lateral forces acting on the tip. In a corresponding embodiment of the device in accordance with the present invention the microscopic probe (e.g. the cantilever of an AFM) is therefore oriented such that its longitudinal axis forms a non-negligible angle with respect to the sample surface, said angle lying within a range of 5° to 35°, preferably 10° to 25°, in particular 15°. As a function of the tribological and elastic properties of the contact, the measurement tip does not follow said lateral displacement of the equilibrium position at all or only partly, which results in a specific periodic deformation of the microscopic probe which is a measure of the lateral force acting on the measurement tip due to the modulation motion, and which is analysed in the context of the present invention. As a function of parameters, in particular microscopic probe type and/or modulation amplitude, the method in accordance with the present invention can be used as a measuring/determining method for to determine friction forces and/or lateral contact stiffness.

In an embodiment of the method in accordance with the present invention a modulation amplitude of the distance modulation is chosen such that the measurement tip is at least temporarily in a sticking regime with respect to the sample surface, and in said sticking regime local elastic and/or viscoelastic properties of the sample surface at the measurement tip are determined from a buckling contribution to the normal force signal.

In a further embodiment of the method in accordance with the present invention a modulation amplitude of the distance modulation is chosen such that the measurement tip is at least temporarily in a sliding regime with respect to the sample surface and that in said sliding regime tribological properties of the contact are determined from a buckling contribution to the normal force signal.

In a further embodiment of the method in accordance with the present invention said buckling deformation of the microscopic probe is identified from a relative phase of the normal force signal and said distance modulation. In particular, a relative phase of about −180° between the normal force signal and said distance modulation can be used as an indicator for identifying a "sticking regime", i.e. a regime of distance modulation amplitude, for which the measurement tip of the microscopic probe sticks on the sample surface, i.e. does not perform any lateral motion due to the said distance modulation. As will be described in detail in the present document, said regime can be used for determining a lateral stiffness of the contact between measurement tip and sample surface.

In another embodiment of the method in accordance with the present invention—as already indicated above—a frequency of said distance modulation is controlled to be different from a frequency of mechanical resonance of at least one of the microscopic probe, the support of the microscopic probe, a holding means used for holding the sample material, and a modulating means used for modulating the distance between said probe holder and the surface of the sample material.

In order to be able to use the method in accordance with the present invention for (two-dimensional) imaging applications, e.g. for material characterisation, in a further embodiment of the method in accordance with the present invention a lateral scanning motion of the microscopic probe is performed in a direction essentially parallel to the sample surface and in parallel with the normal distance modulation.

In order to provide a spectrum representing a measurement signal as a function of modulation amplitude for every scanned measurement point of the sample surface, such that elastical properties and friction properties of the sample surface and the tip-sample contact can be analysed and determined with spatial resolution on the micrometer and nanometer scale, respectively, in a variant of the method in accordance with the present invention at least part of the sample surface is scanned by means of the microscopic probe for different amplitudes of said distance modulation, preferably for 2 to 500 different amplitudes, in particular 5 to 50 different amplitudes.

For to enable using the method in accordance with the present invention for measuring a friction force of said tip-sample contact, in another embodiment of the method in accordance with the present invention an amplitude of said distance modulation is controlled to lie in a regime of an essentially constant normal force signal, said normal force being a function of said modulation amplitude.

The aforementioned embodiment of the method in accordance with the present invention provides the basis of using VM-LD for dynamical friction measurement, hereinafter also referred to as Oscillating Friction Mode (OFM), which will be explained in detail farther down.

In particular for controlling the amplitude of said distance modulation to lie in a regime of essentially constant normal force, in yet another embodiment of the method in accordance with the present invention an amplitude of said distance modulation is determined by controlling a relative phase of said normal force signal and said distance modulation to lie within a range of −140° to −90°, preferably −130° to −120°.

In other words: A modulation amplitude or a stroke of any non-periodical distance modulation between the microscopic probe and the sample material is suitably chosen such that the measurement tip laterally slides on the sample material at least during part of said distance modulation owing to a change of the distance between probe support and sample surface and does not remain in sticking contact with the sample material without sliding during the entire modulation.

Relying on a simple mechanical model employed in the context of the present invention, in a further embodiment of the method in accordance with the present invention a friction force, $F_R$, of said contact is determined from a measured normal force signal according to a relation:

$$F_R = -k_y \cdot \frac{\xi_{bend}}{\xi_y} \cdot \frac{T_c}{\rho} \cdot \tilde{U}_{FMM},$$

wherein $k_y$ is a buckling force constant of the microscopic probe, $\xi_{bend}$ is an angular detection sensitivity of the microscopic probe for a motion of the measurement tip in normal direction (z-direction) and for vanishing lateral force (in y-direction), $\xi_y$ is a buckling detection sensitivity for motion of the measurement tip in lateral direction (y-direction) and for fixed normal position (z-position), respectively, $T_c$ is a correction term close to unity, $\rho$ is a numeric correction factor dependent on detection sensitivities and close to 1.1, and wherein $\tilde{U}_{FMM}$ is a (normalised) measured amplitude of the normal force. In this way, according to the invention said friction force can be determined directly from a measured amplitude, $\tilde{U}_{FMM}$, of the normal force signal.

For determining a lateral stiffness of the contact form between the measurement tip and the sample surface/sample material, in a further embodiment of the method in accordance with the present invention, an amplitude of said distance modulation is controlled to lie in a regime of sticking of the measurement tip to the sample surface. As already indicated above, in a further development of the method in accordance with the present invention said distance modulation amplitude is controlled by restraining a relative phase of the normal force signal and the distance modulation to a value essentially equal to −180°.

In this way, lateral stiffness of the contact can be derived directly from the slope of a measured amplitude of the normal force signal when plotted as a function of the modulation amplitude, using the above-mentioned mechanical model. Therefore, in another embodiment of the method in accordance with the present invention a lateral stiffness of the contact is determined from a measured change, $d\tilde{U}/dA$, of the normalised force amplitude, U, as a function of the (normal) amplitude of said distance modulation, in particular according to a relation:

$$k_{lat} = k_{yy} \frac{\frac{\xi_{haft}}{\kappa_{n,haft}(\tilde{\lambda}_0)} - \xi_{bend}}{\xi_z - \frac{\xi_{haft}}{\kappa_{n,haft}(\tilde{\lambda}_0)}},$$

wherein $$\xi_{haft} = \xi_{bend}\tilde{\xi}_{haft} = \xi_{bend}\frac{d\tilde{U}_{FMM}}{dA_z}\bigg|_{haft}$$

with $k_{yy}$ being the buckling force constant ($k_{yy}=k_y$), $\xi_{bend}$ being an bending detection sensitivity of the microscopic probe, $\kappa_{n,haft}$ being a transfer factor representing a normal displacement of the measurement tip in reaction to a normal displacement of the sample surface, $\xi_z$ being a scalar angular detection sensitivity of the microscopic probe for the special case of motion in the normal direction (z-direction) with laterally fixed measurement tip, $\tilde{U}_{FMM}$ being said (normalised) measured amplitude of the normal force, and $A_z$ being an amplitude of said distance modulation.

For the purpose of further analysis, in yet another embodiment of the method in accordance with the present invention said normal force is measured repeatedly for respective different values of a normal force of the microscopic probe on the sample surface.

In order for simple contact model, e.g. the Hertz model, to be applicable for analysing purposes in the context of the present invention, in a further embodiment of the device in accordance with the present invention the measurement tip of the microscopic probe has an essentially spherical shape, in particular at its apex actually contacting the sample surface.

In order to achieve enhanced detection sensitivity, in yet a further embodiment of the device in accordance with the present invention a length, L, of the microscopic probe and a height; H, of the measurement tip satisfy the relation:

$$\frac{H}{L} \ll 1.$$

For enabling determining a friction force of said tip-sample contact, in accordance with a further development of the device in accordance with the present invention, the microscopic probe has a low buckling force constant, $k_y$, satisfying the relation:

$$k_y < k_{lat},$$

wherein $k_{lat}$ is a lateral stiffness of said contact.

Furthermore, particularly when used for determining a lateral stiffness of said tip-sample contact, in yet another embodiment of the device in accordance with the present invention the microscopic probe has a buckling force constant, $k_y$, satisfying the relation:

$$k_y \approx k_{lat},$$

wherein $k_{lat}$ is a lateral stiffness of said contact.

In an embodiment of the method in accordance with the present invention the phase shift between vertical sensor-sample distance modulation and the detector or sensor signal in the sliding regime or in the sticking regime is used to obtain material contrast or chemical contrast or to obtain information on the tribological, elastic or viscoelastic properties of the sample and the tip-sample contact.

In another embodiment of the method in accordance with the present invention the phase shift between vertical sensor-sample distance modulation and the detector or sensor signal is used to distinguish between the sticking regime and the sliding regime, thus allowing to select the correct modulation amplitude for either frictional measurements and contrasting (in the sliding regime) or for measurements and contrasting of elastic/viscoelastic properties (in the sticking regime).

A variety of further embodiments of the method and/or device in accordance with the present invention can advantageously be devised:

In a further embodiment of the method in accordance with the present invention said distance modulation is achieved by moving the microscopic probe and/or a probe support thereof.

Additionally or alternatively said distance can be modulated by moving a holding means (sample stage) for holding the sample material.

In a further embodiment of the method in accordance with the present invention a relative motion between the probe support and the sample stage is performed in a direction normal or essentially normal to the sample surface.

In a further embodiment of the method in accordance with the present invention said modulation motion has a sinusoidal time dependency.

In order to achieve greater amplitude of said modulation motion, in yet a further embodiment of the method in accordance with the present invention said modulation motion can be performed at a frequency at which corresponding motor means have a mechanical and/or electro-mechanical resonance. In other words: a frequency of said distance modulation is controlled to be in accordance with a frequency of mechanical or an electromechanical resonance of at least one of the microscopic probe, the support of the microscopic probe, a holding means used for holding the sample material, a modulating means used for modulating the distance (d) between said probe holder and the surface of the sample material, and a coupled system comprising several of the said components of the device.

Possible uses of the method in accordance with the present invention include determining qualitative information on a local elasticity modulus (E modulus or Young's modulus), quantitative information on a local Young's modulus, qualitative information on a local shearing modulus, and quantitative information on a local shearing modulus of the sample material.

In another embodiment of the method in accordance with the present invention analysis of the measured normal force signal is performed using a contact model, e.g. the Hertz model, the Hertz-plus-Offset model considering adhesion forces, the Frogden-White model, the MD model, the JKR model, or the DMT model.

Further uses of a method in accordance with the present invention include relative or absolute and qualitative or quantitative measurement of friction forces.

When using the method in accordance with the present invention, during mapping of surfaces a material contrast and/or a chemical contrast between different regions of a heterogeneous surface can be achieved if regions of a sample surface differ from one another with respect to their elastical and/or friction properties or with respect to their tip-sample interaction.

Generally, a suitable modulation amplitude can be chosen by means of amplitude spectra. Alternatively or additionally, a suitable modulation amplitude can be chosen by means of phase information.

A further embodiment of the method in accordance with the present invention comprises the step of using any other suitable demodulation technique instead of a Lock-In technique.

Further embodiments of the device in accordance with the present invention include using any other force sensor instead of an atomic force cantilever as well as using a measurement tip devised as a "blunt tip", an apex of which has a relatively large tip radius of 100 nm or more.

As—to some extend—already stated above, there are generally four variants or fields of application of the (VM-LD-) method in accordance with the present invention and/or a device adapted to perform said method:

1. Modulation motion with an amplitude lower than a limiting sticking amplitude:
   In this case, the modulation amplitude is chosen small enough, such that modulation motion does not provoke any motion of the measurement tip on the sample surface. The relative motion of the probe support with respect to the sample stage, i.e. a sample surface, is compensated by means of (mostly elastical) deformation of tip, probe, and sample. The resulting measurement signal provides desired information on the elastical properties of the tip-sample contact. Assuming known elastical properties of the microscopic probe and a measurement tip, this enables quantitative determining of lateral contact stiffness between measurement tip and sample surface.
2. Modulation motion with an amplitude above said limiting sticking amplitude:
   In this case a modulation amplitude is chosen large enough, such that at least during part of a modulation period a sliding motion of the tip on the sample surface is induced by the modulation motion. The motion of the probe support relative to the sample stage, i.e. the sample surface, is not compensated by a (mostly elastical) deformation of tip, probe, and sample in this amplitude regime. Assuming known elastical properties of the microscopic probe and the measurement tip, desired information on tribological properties of the tip-sample contact can be derived from the resulting measurement signal.

3 Spectroscopic modi, wherein the modulation amplitude is varied. Advantageously, said variation is performed on a range of amplitude values which encompasses both cases 1) and 2) as described above.

4. Using the method in accordance with the present invention for distinguishing and contrasting of sample surface regions with a spatial revolution down to the nanometer scale due to locally different elastical and tribological properties of the tip-sample contact.

Whereas in the above-mentioned first case the measurement signal provides information about local elastic properties of the sample and the tip-sample contact, said second method allows determining local friction properties. Said spectroscopic modi enable a combination of both embodiments of the method in accordance with the present invention in a single measurement procedure. A variant of the spectroscopic method consists in recording an image for a number of N different but fixed modulation amplitudes for a respective imaging scan in a scanning procedure, wherein for every point on the sample surface a spectrum of the measurement signal with N data points is obtained as a function of modulation amplitude, from which the elastical and tribological properties belonging to said point can be determined.

Respective advantages of the above-defined four variants of the (VM-LD-) method in accordance with the present invention when employed in the context of an AFM will be described in further detail in the following:

1. VM-LD-method with modulation motion with amplitudes below the limiting sticking amplitude:

The VM-LD method can be used as a method for determining the lateral contact stiffness by means of normal modulation of the sample position. Examples as to suitable parameters, analysis and possible applications will be given farther down in the present document. In order to delimit the above-described measuring mode with respect to other modulation techniques it will hereinafter be referred to as "Low Amplitude Buckling Mode" (LABM).

A particular advantage of LABM arises from the fact that—while the lateral contact stiffness is comparable with the normal contact stiffness—the buckling force constant is greater than the bending force constant by several orders of magnitude. In this way, it is possible to achieve high lateral forces with cantilevers which are relatively soft with respect to their bending force constant. The achievable low normal forces, which preserve the contact and which are easily characterised, provide an approach to harder sample systems, the Young's modulus of which ranges up to the order of magnitude of the Young's modulus of the measurement tip. Furthermore, modification of contact characteristics due to tip wear, as reported, e.g., for Ultrasound Microscopy (UAFM), are not to be expected to the same extend [15]. The possible use of common contact cantilevers with small bending force constants further enables a gentle scanning of sample topography with the same cantilever as used for elasticity-microscopy owing to the low possible normal forces. Furthermore, in the case of hard cantilevers sensitivity for sample topography generally decreases for physical reasons due to contact deformation, if the normal contact stiffness is small with respect to the bending force constant.

The use of relatively soft cantilevers and low normal forces not only enables study of harder sample systems. It can also be employed advantageously for studying softer and damageable samples, e.g. polymeric samples such as latex colloids. Sample systems of this kind often cannot be scanned with harder cantilevers in contact mode.

2. VM-LD with modulation motion with amplitudes above the limiting amplitude:

Many atomic force microscopes are equipped for FMM such that a dynamical method for friction measurement on the basis of FMM with normal excitation of the sample as proposed in accordance with the present invention is easy to implement. Furthermore, the above-mentioned problems arising from calibration of a lateral force channel are not to be considered in the context of the present invention, since detection sensitivities for the normal force channel (NFM channel) are easily determined by means of a bending motion (for suitably large z-movements) on suitably hard sample systems (i.e., bending force constant of cantilever, $k_n$, much greater than contact stiffness, $k_c$) from the bending detection sensitivity with high accuracy. Deriving the detection sensitivity for NFM from such force-distance measurements are much less accurate, since adjustment of a laser used for optical deformation detection, geometry of the laser beam and also geometry and sensitivity of the detector have to be taken into account. Insofar, detection of bending and buckling on a common detection channel can be considered an advantage with respect to calibration of lateral force measurements. Bending motion furthermore allows an easy calibration of modulation amplitude. The latter can deviate from a nominal amplitude (calculated from an applied voltage in conjunction with quasi-static sensitivity of the piezo-element) due to hysteresis in the range of small modulation amplitude or due to dynamically effects. Said deviation can be determined by comparing the bending detection sensitivity measured in a quasi-static fashion on larger z-scale (e.g., from force-distance curves) with a bending detection sensitivity apparently measured by means of modulation experiments.

The VM-LD method can be used to measure friction forces in a quantitative way. An important condition is the choice of the correct modulation parameters together with choosing a suitable microscopic probe (cantilever), the buckling force constant of which should be smaller than the lateral contact stiffness. At a modulation frequency below any resonant frequency of the system, it is necessary to choose a modulation amplitude in a plateau regime of the FMM amplitude spectrum, as will be explained in detail farther down. In this context, the FMM phase can be used as a useful indicator.

In order to delimit the above-described mode of the VM-LD method for a dynamical friction measurement with respect to conventional FMM, it will be referred to as Oscillating Friction Mode (OFM) in the remainder of the present document.

3. Spectroscopic modi of the VM-LD method:

The recorded signals, i.e. amplitude and phase signal (cf. above), can be used for measuring tribological and elastical properties of the tip-sample contact not only for suitably chosen modulation amplitude. Said signals can also be recorded as a function of modulation amplitude in the form of a spectrum. Such spectra can also be used for determining elastical and tribological properties. However, they can be used further for determining both the above-mentioned characteristics simultaneously in one measurement. Furthermore, spectra of the above-mentioned kind can be used for determining a suitable modulation amplitude for the above-defined cases 1 and 2.

4. Material contrasting and chemically contrasting imaging using VM-LD:

The proposed method can be used for characterising the contact between the atomic force measurement tip and a chosen sample location with respect to its tribological and/or elastical properties and as an imaging method when combined with a scanning motion. The recorded signal cannot only be used for a spatially resolved representation and determination, respectively, of tribological and/or elastical properties, but also for laterally contrasting of sample parts or regions. This is of particular advantage for studying chemically inhomogeneous surfaces, surface processes, composite and nano-composite materials as well as for detecting and identifying of adsorbates, impurities, and spatially different regions on surfaces, which differ from the sample surface as to their chemistry or with respect to structure and crystallinity.

It is an important advantage of the present invention that it allows to image a sample surface with high lateral resolution down to the micrometer or the nanometer scale, which allows to provide the following five different types of information with one and the same experimental equipment and without the need to change or reposition or remount the sample and with no need to exchange the sensor or cantilever between the different measurements: 1) Imaging a surface with chemical contrast or material contrast due to contrasts of different sample areas in tip-sample interaction and/or frictional forces; 2) Imaging a surface with chemical contrast or material contrast due to contrasts in elastic or viscoelastic properties between different areas of the sample surface or surface-near regions; 3) Qualitative and quantitative determination of the three-dimensional topography of a sample surface with the said high lateral resolution; 4) Quantitative determination and mapping of friction and tribological properties as a function of the position of the sensor on the sample surface; 5) Quantitative determination and mapping of elastic and/or viscoelastic properties of the sample surface and surface-near regions as a function of the position of the sensor on the sample surface. The fact that all these measurements are possible without exchanging the sensor or the cantilever guarantees that all the five types of information are really taken from exactly the same surface spot or surface area, as no readjustment after sample or sensor exchange is necessary; furthermore, there is no need to readjust and position the sensor or the laser after sensor exchange, which could lead to a non-reproducible sensitivity and would make it impossible to correlate the five measured sets of data described above.

Further advantages and characteristics of the present invention can be gathered from the following description of preferred embodiments given by way of example only with reference to the enclosed drawings. Individual features disclosed above as well as below can be used either individually or in conjunction in the context of the present invention. The embodiments described are not to be regarded as an exhaustive enumeration but rather as examples for carrying out the invention.

BRIEF DESCRIPTION OF THE DRAWINGS

FIG. 4b is a side view of the cantilever of FIG. 4a;

DETAILED DESCRIPTION

Figure 1:
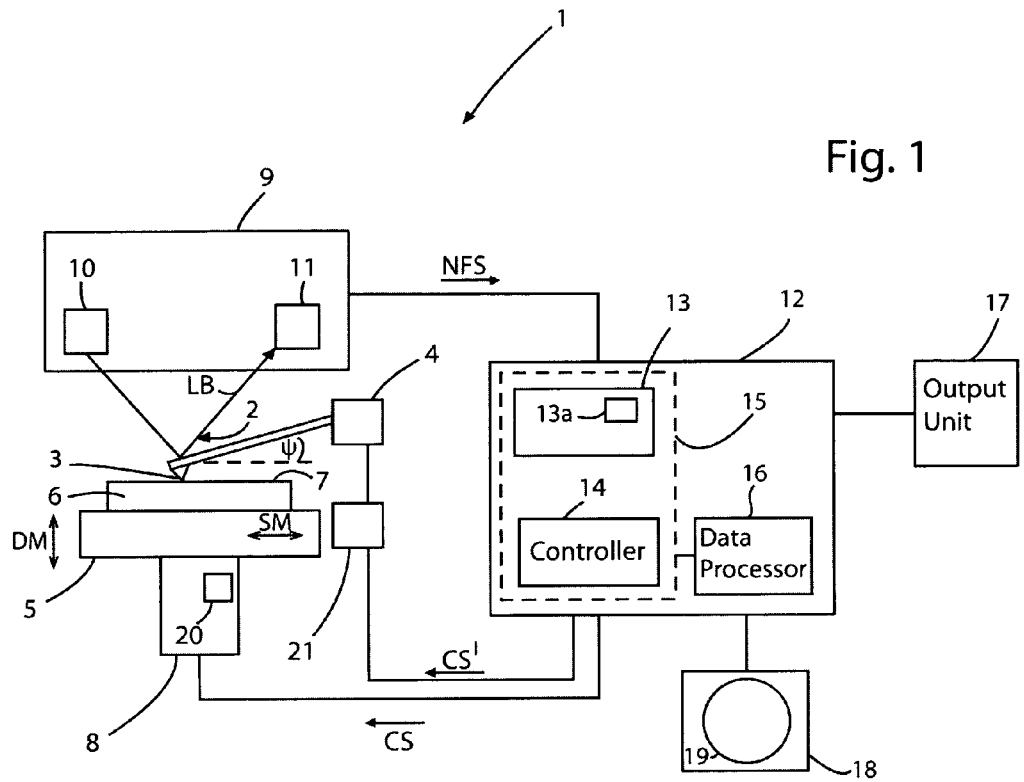
FIG. 1 is a schematic block diagram of an embodiment of the device in accordance with the present invention comprising a control/analysis unit in accordance with the present invention.

FIG. 1 shows a schematic block diagram of a device 1 for determining material properties of a contact formed between a measurement tip of a measurement probe and a sample surface of a sample material. The device 1 comprises a microscopic probe 2, which is devised as a cantilever, having measurement tip 3. The microscopic probe 2 is attached to a probe support 4. Device 1 further has a sample stage 5 for holding a sample material 6 such that the measurement tip 3 of microscopic probe 2 faces a sample surface 7 of the sample material 6. In operative connection with sample stage 5, there is further provided a distance modulating means 8, preferably devised as a piezo-electric unit. The distance modulating means 8 is adapted for moving the sample stage 5 in respective directions indicated by means of double-headed arrow DM such that a distance between sample stage 5 and probe support 4 can be modulated with measurement tip 3 being in mechanical contact with sample surface 7 of sample material 6, as known to a person skilled in the art. Device 1 further comprises force sensing means 9 adapted to determine forces acting on microscopic probe 2 through a contact (not shown) formed between measurement tip 3 and sample surface 7. In the embodiment of FIG. 1, the force sensing means 9 comprises a light beam generator 10, e.g. a laser diode, for generating a light beam LB, which is reflected from the microscopic probe 2 and detected by position-sensitive detector 11, e.g. a photo diode, as known to a person skilled in the art. In this way, forces leading to a deformation of the microscopic probe 2 can be sensed by means of a position variation of light beam LB on detector 11. As will be appreciated by a person skilled in the art, normal forces acting on the microscopic probe 2, i.e. forces which are effective parallel to a direction normal to the sample surface 7, will result in a position variation of laser beam LB. However, also lateral forces acting on the microscopic probe 2, which are effective in a plane parallel to sample surface 7 and parallel to a projection of a longitudinal axis of the microscopic probe 2, comprise a normal force component, which is of importance in the context of the present invention, as will be explained in detail with reference to appended FIGS. 3a to 9b.

Force sensing means 9 is connected with a control/analysing unit 12 for providing to the latter at least a normal force signal NFS indicative of a normal force effective on microscopic probe 2 in a direction essentially normal to sample surface 7, when said microscopic probe is in contact with the sample surface and a distance between the sample surface and the probe support is being modulated, as indicated by means of arrow DM. In the embodiment shown, control/analysing unit 12 comprises signal processing means 13 including demodulating means 13a and control means 14 as well as data storage means 15. In a preferred embodiment of the invention, the signal processing means 13 and the control means 14 can be devised in software form in a data processing means 16, as indicated by a dashed box in FIG. 1. Alternatively, a separate data processing means (not shown) can be provided in control/analysing unit 12, said separate data processing means being operatively connected with signal processing means 13 and/or control means 14 for controlling an operation thereof. Any program code needed for operation of data processing means 15 is stored in storage means 16. Control/analysing unit 12 is further connected with an output unit 17, which can take on any suitable form, e.g. a display, a printer, a network interface, etc. In addition, control/analysing unit 12 is connected with an input unit 18, particular for providing program code sequences to the control/analysing unit 12, i.e. to storage means 16, by means of a computer program product contained on a suitable data carrier medium 19. For instance, input unit 18 could be devised as a CD-ROM or DVD drive or any other suitable input unit known to a person skilled in the art.

Although not shown in appended FIG. 1, the data processing means 13 and the control means 14 can be devised as separate entities such that the control/analysing device 12 is effectively realised in the form of physically separate apparatus. For instance, said control means can be arranged separately from said data processing means in the form of a conventional frequency generator.

Control/analysing unit 12 is further connected with distance modulating means 8 described above for controlling operation thereof by means of control signal CS. In addition to vertical motion as indicated by arrow DM, distance modulating means 8 comprises motor means 20, e.g. a piezoelectric scanner, for generating a lateral scanning motion of the sample, as indicated by means of double-headed arrow SM. The device 1 preferably also comprises a step motor 21 for changing a position of probe support 4 with respect to the sample stage 5 in order to control a normal force of microscopic probe 2 on the sample surface 7, as will be explained in detail farther down. Motor means 20 are controlled by the control/analysing unit 12 by means of further control signal CS'.

Generally, during operation of device 1 as shown in FIG. 1, the measurement tip 3 of microscopic probe 2 is brought into contact with sample surface 7 of sample material 6 such that a longitudinal axis of the microscopic probe 2 forms an angle $\phi$ of preferably 15° with respect to the sample surface 7, as shown in FIG. 1. Then, by means of distance modulating means 8, in the embodiment shown the sample stage 5 is periodically moved up and down thus modulating the distance between sample stage 5 and probe support 4. Alternatively, this could be achieved by periodically moving the probe support 4. Owing to the chosen geometry of microscopic probe 2 with respect to sample surface 7, said distance modulation will result in normal and lateral/longitudinal forces acting on microscopic probe 2 due to frictional forces acting between the measurement tip 3 and the sample material 6, which will lead to deformation of the microscopic probe 2. Said deformation is then sensed by force sensing means 9, and a force signal, in particular a normal force signal NFS is accordingly provided to control/analysing unit 12 where it is demodulated by means of demodulating means 13a, preferably using a Lock-in technique. The control/analysing unit 12 will then analyse said force signal in accordance with the present invention, as described in detail hereinafter, and output the results via output unit 17. Furthermore, control/analysing unit 12 will control distance modulating means 8 and/or motor means 20 in accordance with the present invention, as also described in detail hereinafter. Alternatively, said control can be achieved by means of an external frequency generator (not shown), as known to a person skilled in the art.

Figure 2:
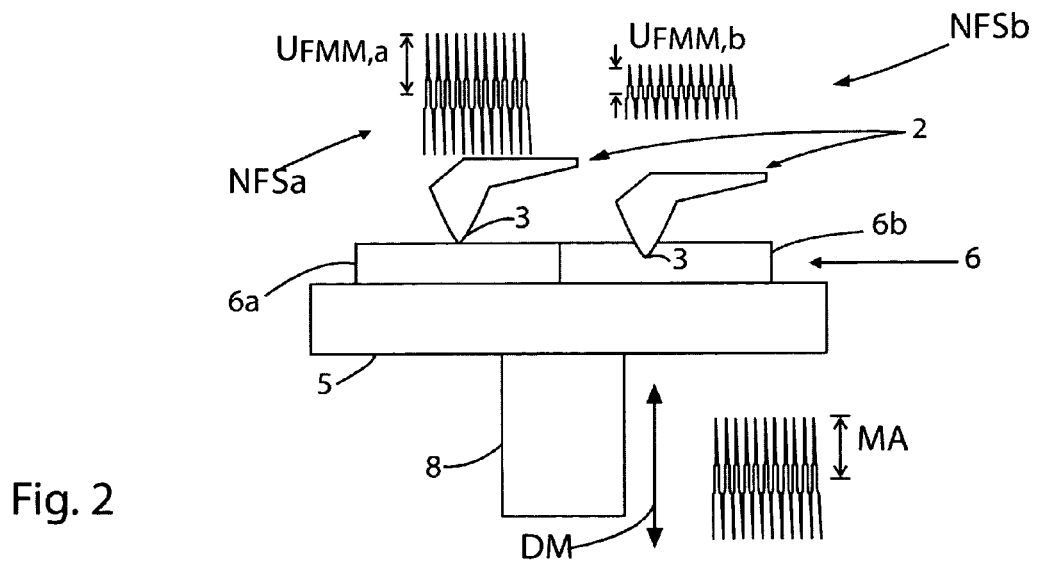
FIG. 2 is a detailed partial view of the device of FIG. 1 illustrative of a generation of a normal force signal.

FIG. 2 shows a detailed view of sample stage 5, sample material 6 as well as the microscopic probe 2 of FIG. 1. Same or similar elements have been assigned the same reference numerals. In FIG. 2, two different sample materials 6a, 6b are shown for comparison, wherein sample material 6a is harder than sample material 6b. This is illustrated by means of the measurement tip 3 "sinking into" sample material 6b. Vertical (i.e., normal) distance modulation DM of sample stage 5 relative to a probe holder (not shown) by means of distance modulating means 8 gives rise to normal force signal NFSa in the case of probe material 6a and normal force signal NFSb in the case of sample material 6b. An amplitude of the distance modulation is denoted MA in FIG. 2. The resulting amplitudes of the normal force signals (hereinafter also referred to as "FMM amplitude") are denoted $U_{FMM,a}$ and $U_{FMM,b}$, respectively. Strictly speaking, the above-given definition is true only for conventional FMM. However, as will be described farther down, in the context of the present invention preferably an amplitude of the first harmonic of the normal force signal at the excitation frequency is used for analysis. In the present document, said amplitude of the first harmonic of the normal force signal at the excitation frequency will also be referred to as "FMM amplitude". Differences in the observed FMM amplitude are due to different mechanical coupling for hard and soft sample materials, respectively, as known to a person skilled in the art. A frequency of the distance modulation DM is preferably controlled to be different from any frequency of (electro-)mechanical resonance of at least one of the microscopic probe 2, the sample stage 5 and the distance modulating means 8 as well as of any other mechanical component used for holding and/or contacting the sample material.

Figure 3A:
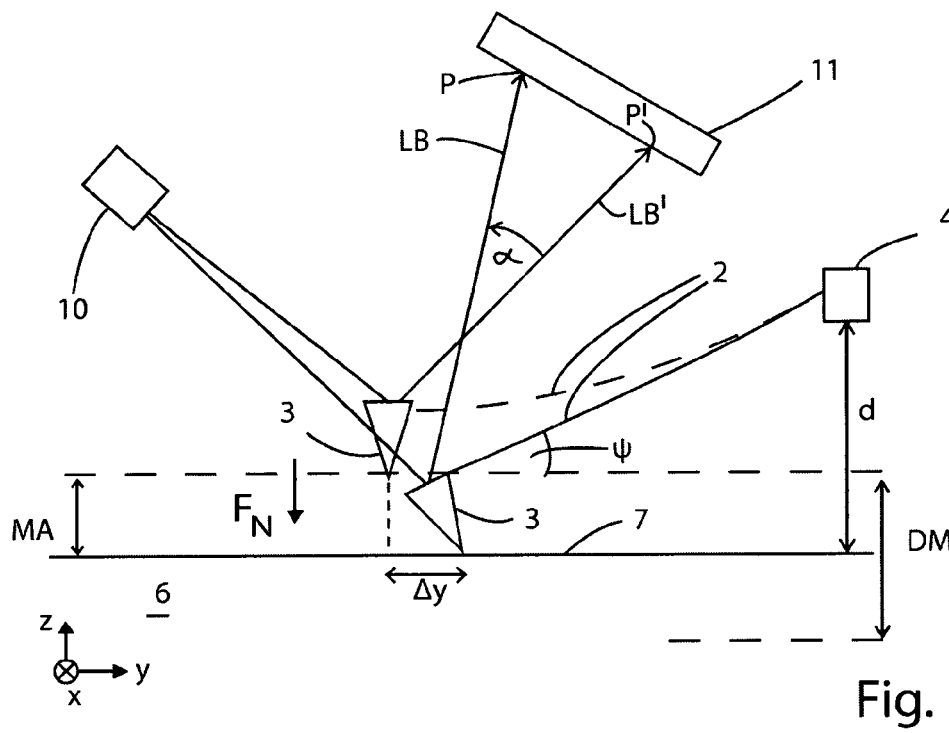
FIG. 3a is a schematic diagram illustrative of a bending deformation of a microscopic probe in contact with a sample surface.

FIG. 3a shows a schematic diagram indicative of a first mode of deformation of the microscopic probe 2 as previously described with reference to appended FIGS. 1 and 2. Again, in FIG. 3a previously described elements have been assigned the same reference numerals. As can be gathered from FIG. 3a the measurement tip 3 of the microscopic probe 2 (solid line) initially contacts the sample surface 7 of sample material 6 with normal force $F_N$ dependent on distance d between probe holder 4 and sample surface 7 in a rest position of distance modulation DM. Light beam LB from source 10 is then reflected to a position P on detector 11, as previously described with reference to appended FIG. 1.

FIG. 3a illustrates the case of sample surface 7 moving upwards (i.e. towards probe holder 4, by an amount given by modulation amplitude MA (cf. FIG. 2), wherein a contact position of measurement tip 3 on sample surface 7 is not fixed in lateral direction, i.e. parallel to sample surface 7 such that lateral forces are negligible. The inherent displacement of the above-mentioned equilibrium position of the measurement tip due to the geometry of the microscopic probe lead to a lateral displacement Δy of the measurement tip with respect to the sample surface. This results in a bending deformation of the microscopic probe 2, as indicated by means of a dash-dotted line in FIG. 3a. Said bending deformation can also be referred to as a deformation of the microscopic probe relative to, i.e. toward, the sample surface 7, as shown in FIG. 3a. This results in a light beam LB' reflected from microscopic probe 2 and impacting at a different position P' on detector 11. As will be appreciated by a person skilled in the art, a difference between said positions P, P' will be detected as a normal force signal NFS (FIG. 1) as transmitted on the normal force channel (NFM channel) of a typical Atomic Force Microscope (AFM). Angle α between light beams LB and LB' corresponds to a bending detection sensitivity of microscopic probe 2.

Figure 3B:
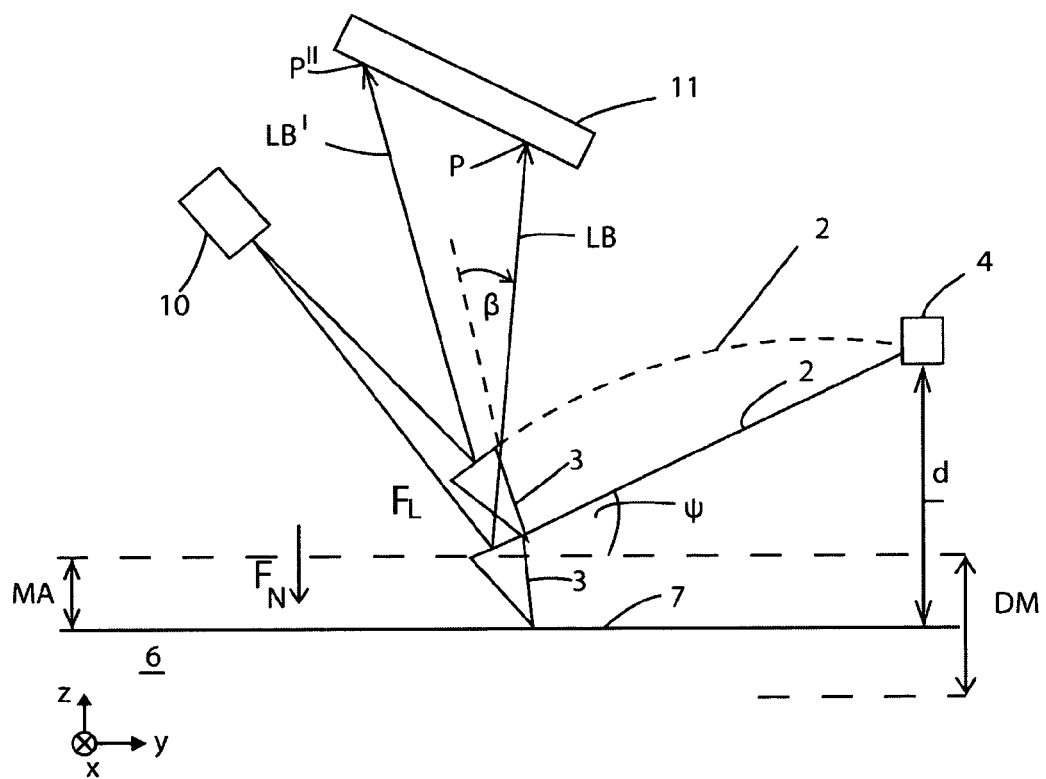
FIG. 3b is a schematic diagram illustrative of a buckling deformation of a microscopic probe in contact with a sample surface.

FIG. 3b shows a schematic diagram illustrative of a second deformation mode of the microscopic probe 2. In contrast to the situation depicted in FIG. 3a, measurement tip 3 of microscopic probe 2 is now due to lateral forces $F_L$ acting on the measurement tip laterally fixed (i.e., it sticks) on the sample surface 7 of sample material 6. In this way, owing to the geometrical configuration of microscopic probe 2 relative to sample surface 7 (angle ϕ) the lateral force leads to a concave deformation of a microscopic probe 2, relative to and away from the sample surface 7. This is illustrated by means of a dash-dotted line in FIG. 3b. In the present document, said concave deformation is also referred to as "buckling". As further indicated in FIG. 3b, said buckling deformation results in a reflection variation of light beam LB", which now impacts at position P''' on detector 11 after reflection from deformed microscopic probe 2. As has been acknowledged with respect to detection position P' of FIG. 3a, detection position P''' of FIG. 3b differs from position P associated with an undeformed microscopic probe 2. However, in contrast to the situation illustrated in FIG. 3a, detection position P is shifted to said position P''' in a direction opposite to that encountered in the situation of FIG. 3a for a bent microscopic probe 2. Generally, bending and buckling deformations of microscopic probe 2 will lead to different detection sensitivities, as indicated of light beam reflection variation angles α (FIG. 3a) and β (FIG. 3b), which are not only associated with rotations in different directions but will typically be of different absolute values, too.

However, as will be appreciated by a person skilled in the art, both buckling (FIG. 3b) and bending (FIG. 3a) deformations will result in a normal force signal NFS, which entails inherent difficulties when interpreting normal force signals as obtained by means of the device described above with reference to FIGS. 1 and 2.

Figure 4A:
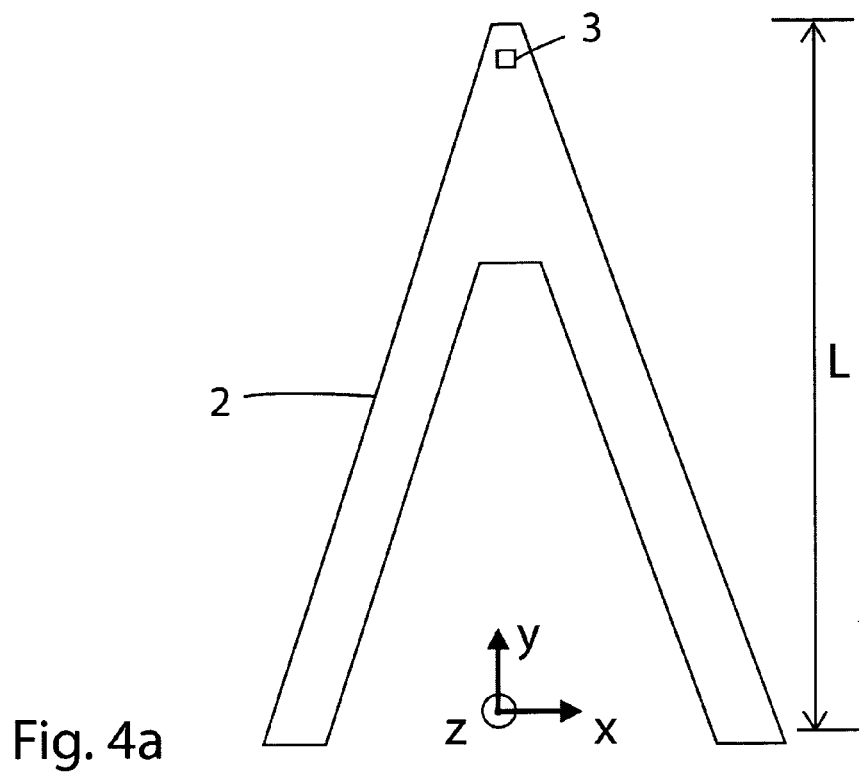
FIG. 4a is a top view of a microscopic probe in the form of a cantilever.

FIG. 4a shows a top view of a microscopic probe 2 preferably used in an embodiment of the device in accordance with the present invention, e.g. as described above with reference to appended FIG. 1. The microscopic probe 2 of FIG. 4a is generally devised as a cantilever of overall triangular shape, as will be appreciated by a person skilled in the art. In its longitudinal direction (y) cantilever 2 has a characteristic length L. As before, reference numeral 3 denotes the measurement tip of microscopic probe 2. Alternatively, beam or rod-like cantilevers could be used.

Figure 4B:
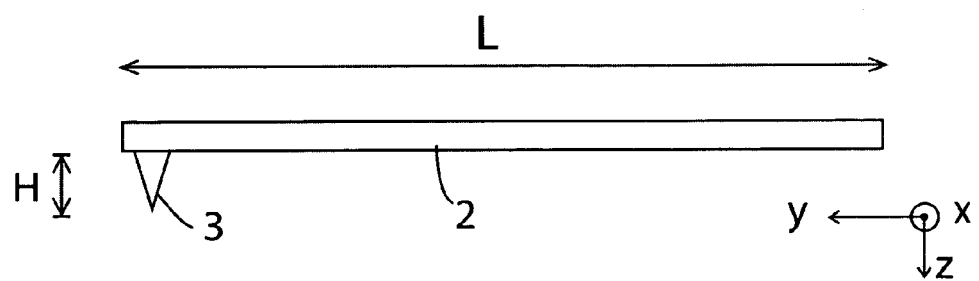

FIG. 4b shows a side view of the cantilever 2 of FIG. 4a, wherein a height of measurement tip 3 is denoted H.

In the context of the present invention, said cantilever 2 may be of type Microlever™ provided by Park Scientific Instruments made of silicon nitride with gold reflective coating. Measurement tip 3 can be oxide sharpened (sharpened Microlever™) or unsharpened (unsharpened Microlever™) and have tip radii of 20 nm and 50 nm, respectively.

Of particular importance in the context of the present invention are the normal force constant $k'_z$ and the buckling force constant $k'_y$, respectively, of cantilever 2, as defined by the following relations:

$$k'_z = -\frac{\partial F'_z}{\partial z'}\bigg|_{dy'=0},$$

$$k'_y = -\frac{\partial F'_y}{\partial y}\bigg|_{dz'=0},$$

wherein the prime (') symbol is used to represent the sample coordinate system aligned with the sample 6/sample surface 7, i.e. rotated by an angle ϕ with respect to the probe coordinate system aligned with the microscopic probe 2.

Conventionally, for interpreting FMM signals obtained from detecting the normal (vertical) movement of the measurement tip, only the normal (vertical) motion of the measurement tip is taken into account for deriving elastical and viscoelastical properties of the contact formed between measurement tip and the sample material/surface. However, in the presence of friction, lateral displacement of an the above mentioned equilibrium position of the measurement tip (in absence of lateral forces) due to a distance modulation DM, as described above, will have substantial impact on the normal force signal due to buckling of the cantilever. It has been shown by experiment that in the range of small modulation amplitudes of the order of some nanometers a strong dependency of the normal force signal on the modulation amplitude can be observed.

For FMM applications the normal force signal is usually analysed during a sinusoidal modulation of a vertical position (z-position) of the sample using Lock-In techniques. To this end, as stated above, the amplitude of the first harmonic oscillation component of the normal force signal is recorded at the frequency of modulation. In addition, it is possible to measure a relative phase of said first harmonic oscillation component relative to said modulation of the sample position These data, which can be obtained as amplitude and phase signals from the normal force signal by means of a lock-in amplifier are referred to as FMM amplitude and FMM phase, respectively.

Measurement of the aforementioned signals as a function of the modulation amplitude reveals the existence of three characteristic regimes, i.e. a sticking regime for small modulation amplitudes, a transition regime for medium-sized modulation amplitudes, and a sliding regime for relatively large modulation amplitudes.

For suitably small modulation amplitudes, lateral forces due to vertical (z-direction) or normal motion of the sample are smaller than a friction force between the measurement tip and the sample and cannot provoke any lateral motion of the tip on the sample surface. This regime is hereinafter referred to as "sticking regime", in which the normal force signal is proportional to a z-position of the sample, and its temporal evolution is sinusoidal owing to the corresponding excitation modulation. The measured FMM amplitude signal in the sticking regime can be shown to be linearly dependent on the modulation amplitude MA (FIG. 2). When plotting the FMM amplitude signal as a function of modulation amplitude, the slope in the sticking regime is given by the detection sensitivity of the device for a motion of the measurement tip in z-direction with laterally fixed measurement tip. The value of said slope strongly depends on the angle between the cantilever axis and the plane of the sample surface. Due to the sign of said detection sensitivity, the FMM phase can be shown to be equal to $\phi=-180°$ in the sticking regime.

Analogue considerations as for the regime of suitably small amplitudes can be made for a regime of suitably large amplitudes, hereinafter referred to as "sliding regime". In this regime, buckling deformation due to a finite friction force between measurement tip and the sample surface is negligible with respect to bending of the cantilever, which corresponds to the limiting case of a cantilever with its measurement tip being freely displaceable in lateral direction. In this case, too, the normal force signal is approximately proportional to the displacement of the measurement tip in z-direction and shows an essentially sinusoidal form, such that the FMM amplitude signal also is directly proportional to the excitation amplitude. Due to the sign of the respective detection sensitivity, the relative phase with respect to the excitation is equal to $\phi=0°$.

Between the sticking regime and the sliding regime exists a transition regime of modulation amplitudes, in which the normal force signal is not harmonic. During oscillation of the sample there are phase regions in which the measurement tip moves in lateral direction on the sample (sliding phases) as well as phase regions, in which the measurement tip remains locally fixed (sticking phases). In said transition regime, the shape of the FMM amplitude signal and the FMM phase signal, respectively, depend on the effective friction force. In the following, dependency of FMM amplitude and FMM phase, respectively, on modulation amplitude will be referred to as FMM amplitude spectrum and FMM phase spectrum, respectively. A combined graphical illustration of both dependencies will be referred to as FMM spectrum.

Taking into account the finite stiffness of the contact between the measurement tip and the sample surface and assuming sliding friction force and sticking friction force to be identical and constant, a simple quasi-static model can be used to derive a motion of the measurement tip and the detected normal force signal as a function of the z-position of the sample. In said model, the measurement tip completely sticks to the sample surface, as long as an absolute value of the lateral force acting on the measurement tip is smaller than the friction force. Furthermore, it is assumed, that the contact stiffness does not change with the lateral force.

According to said model, the FMM amplitude as a function of modulation amplitude has a plateau, which can be used for a quantitative determination of friction in accordance with the present invention, as will be explained in detail below.

Figure 5:
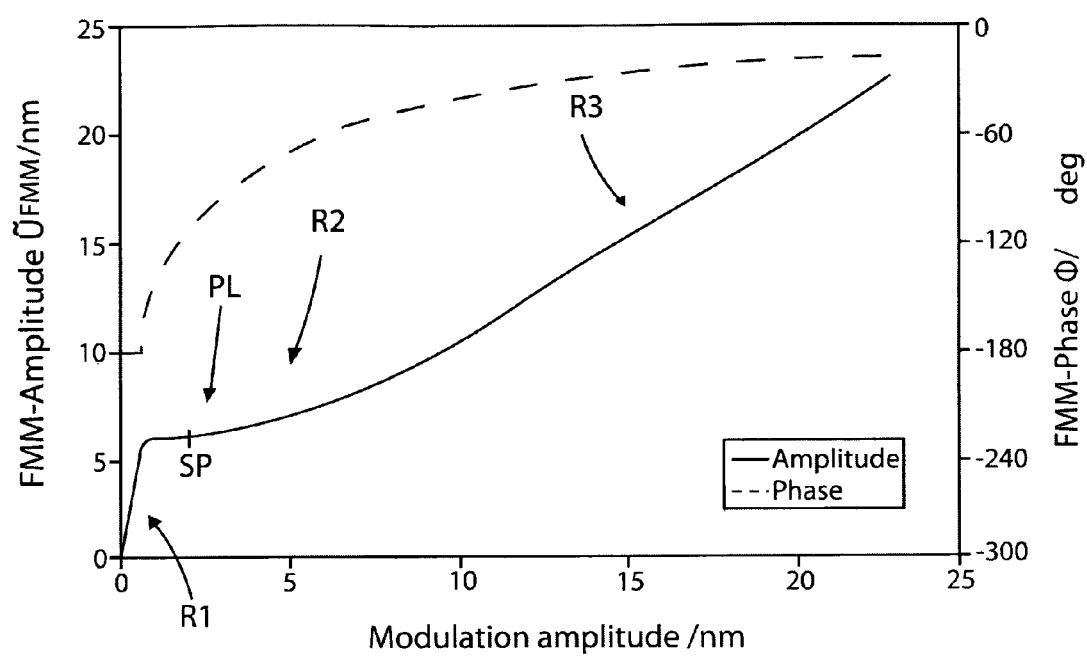
FIG. 5 is a diagram of a theoretical FMM signal spectrum.

FIG. 5 shows theoretical FMM amplitude and FMM phase signals, respectively, calculated from said aforementioned model for a given cantilever. In FIG. 5, the solid line shows the FMM amplitude signal whereas the dotted line shows the FMM phase signal. Regime R1 in FIG. 5 corresponds to the sticking regime, as defined above. Regime R2 corresponds to said transition regime having plateau PL with a saddle point SP and regime R3 corresponds to said sliding regime. As can be gathered from the dotted FMM phase curve in FIG. 5, sticking regime R1 can be identified by a relative phase of $\phi=-180°$, whereas the relative phase tends toward zero for larger values of the modulation amplitude, i.e. in the sliding regime R3. In said transition regime R2 the relative phase slowly changes from $\phi=-180°$ to values around approximately $\phi=-50°$ while at the saddle point SP of the amplitude signal the phase signal takes on a value of approximately $\phi=-120°$.

It can be shown, that according to the above described model, parameters of device 1 (FIG. 1), e.g. an AFM adapted for FMM, can be chosen such that the FMM amplitude in a particular range of excitation amplitudes varies essentially linearly with the friction force. According to the invention, this particular characteristic can be used to quantitatively measure frictional forces with an AFM in a novel way, thus implementing the above described OFM mode. To this end, the microscopic probe, i.e. the cantilever, has to be suitably chosen, as will be described farther down, such that the amplitude spectra show a plateau PL (cf. FIG. 5) on which the FMM amplitude only changes little as a function of the modulation amplitude MA (FIG. 2). According to model calculations, the plateau can be characterised by means of said saddle point SP (FIG. 5) in which the FMM amplitude is proportional to the friction force. Further on, it can be shown that according to the said model the amplitude spectra are similar to each other for different friction forces and that a modulation amplitude corresponding to the saddle point increases proportionally to the friction force. For a quantitative friction measurement it is thus necessary to choose the modulation amplitude to lie in the plateau regime PL around the saddle point SP. In this context, the FMM phase provides a possibility of choosing a suitable modulation amplitude in the plateau regime without previous knowledge of the friction force. As mentioned above, experiments and model calculations have shown that for OFM operation the modulation amplitude MA should be adjusted such that the FMM phase lies in a range of about $\phi=-120°\pm200$ during friction measurement.

Furthermore, the FMM phase provides information as to a relative deviation of FMM amplitude from a linear dependency on the friction force.

FMM amplitude and FMM phase change only little for contact stiffness above the buckling force constant, $k_y$, of a microscopic probe/cantilever. However, for smaller values of the contact stiffness, said parameters may change substantially as a function of contact stiffness. In order to minimise influence of contact stiffness on friction measurement it is important to choose a suitably soft cantilever, e.g. $k_y < k_{lat}$.

For relatively hard sample materials (i.e., having Young's modulus) of the order of 10 GPa or higher) the above described sharpened Microlever™ C with an unmodified tip with nominal tip radius of 20 nm has proved to be a good choice. The contact stiffness for such samples during measurement in air with a typical normal force of several 10 nN is of the order of 100 N/m and above.

For softer sample materials it may be reasonable to use a cantilever with greater tip radius. A greater tip radius directly enhances the contact stiffness. In addition, a greater tip radius entails under ambient conditions an increase in capillary force, which may lead to an increase in the normal force, such that contact stiffness is additionally enhanced. On the other hand, a greater tip radius leads to a decrease of the average contact pressure, which can be an advantage in connection with soft samples in order to avoid excessive deformation or even modification of the sample. An increase of the tip radius can be achieved by vapour deposition of metal, e.g. chromium, or by the deposition of amorphous carbon in a scanning electron microscope. In addition, the latter method will result in tips with highly defined spherical geometry. Such a geometry is preferred in order to obviate modification of the contact during buckling movement and in order to guarantee an applicability of simple contact models, e.g. the Hertz contact model or other contact models such as the DMT model or the JKR model, as known to a person skilled in the art. Application of the above-mentioned contact models is necessary in order to derive tribological and elastical sample properties from measurable values such as the friction force or the contact stiffness.

When examining soft sample materials, use of a cantilever with softer force constant is preferred.

Another requirement is that the angle φ between the cantilever axis and the sample plane should not be too small and should preferably lie within the range of 10°-35°.

However, said angular detection sensitivity also depends on cantilever geometry (cf. FIG. 2). For a given cantilever geometry and for a cantilever tilted relative to the sample plane (angle φ) said detection sensitivity is proportional to L/H, wherein L denotes a length and H denotes a tip height of the cantilever, as already explained above with reference to append FIG. 2. Thus, are to achieve high detection sensitivity long cantilevers with short measurement tip are preferred. Above-mentioned Microlever™ C is an example of a relatively long cantilever with a short measurement tip. It is therefore characterised by a high absolute value of said angular detection sensitivity and there is prove useful for buckling experiments. A relatively short cantilever, e.g. Microlever™ F, is not as well suited due to its relatively low angular detection sensitivity at an angle φ of approximately 15° relative to the sample plane.

Like the conventional FMM, OFM is used as a quasi-static method below the resonance frequency of the cantilever. For a quantitative interpretation additional knowledge of the modulation amplitude is required. Therefore, the modulation frequencies should be chosen such that dynamical excitation effects, which are difficult to characterise, are not of importance during excitation. To achieve higher modulation frequencies an additional ultrasonic actuator (not shown) could be used.

In contrast to the FMM amplitude at the saddle point SP (FIG. 5), the FMM amplitude at the end of sticking regime R1 can be expressed analytically. In this way, the FMM amplitude at the saddle point can be decomposed in an analytically derivable part and a correction factor, wherein the latter depends only on the (known) detection sensitivities of the microscopic probe/cantilever. In this way, the friction force can be determined directly from the measured FMM amplitude at the saddle point SP (FIG. 5) while taking into account said correction factor as well as elastic parameters and detection sensitivities characteristic of a specific microscopic probe/cantilever used. The above-mentioned considerations, the OFM can be used for quantitative friction measurement. Experiments were performed using a sharpened Microlever™ C, the longitudinal axis (y-axis; FIG. 4a, b) of which was tilted by φ=15° with respect to the sample surface.

For determining friction parameters, a series of FMM spectra can be recorded without a lateral scanning motion. By lowering the microscopic probe/cantilever toward the sample material by means of a stepping motor (FIG. 1) the normal force was increased owing to an enhancement of the spring force of the cantilever in a step-like manner. Prior to and after recording of said series, adhesion and normal force were determined by means of force-distance-measurements, as known to a person skilled in the art. Since a transfer constant of the device changes substantially due to bending of the cantilever during the measurement, the slope of the curves was normalised to unity for calibration purposes in the sliding regime R3 (FIG. 5). For determining the friction force effective in the tribocontact between the measurement tip of the cantilever and the sample material the FMM amplitude is analysed at that particular modulation amplitude for which the FMM phase takes on a value of φ=−120°, which corresponds to the FMM amplitude in the saddle point. This was repeated for different values of normal force FMM (FIGS. 3a, b).

Figure 6A:
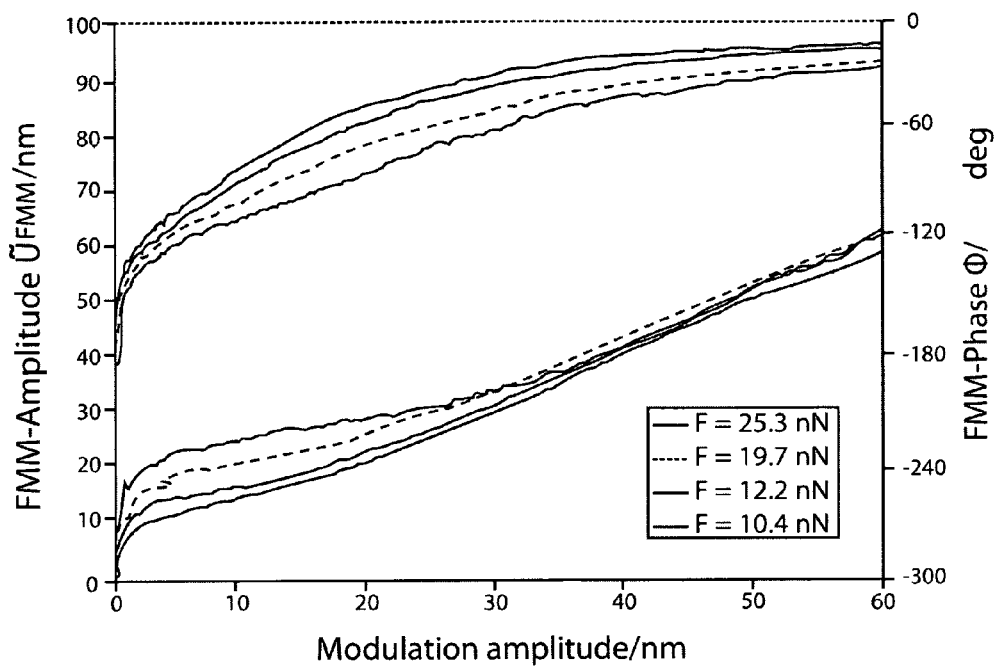
FIGS. 6a, b are diagrams showing measurement results obtained by means of a first embodiment of the method in accordance with the present invention.

Appended FIG. 6a shows experimental results of measured FMM amplitude as a function of the modulation amplitude using a mica sample. Spectra of FIG. 6a qualitatively show the above-described theoretical behaviour (cf. FIG. 5). The FMM amplitude in the transition regime R2 (FIG. 5) increases toward higher values of normal force and thus with increasing friction force. On the other hand, the measured spectra of FIG. 6a show a reduced FMM amplitude for modulation amplitudes in an interval ranging from the end of the sticking regime R1 (FIG. 5) approximately up to the saddle point SP (FIG. 5). Therefore, the plateau is less pronounced and then expected from theoretical computation and observed with other sample materials.

Figure 6B:
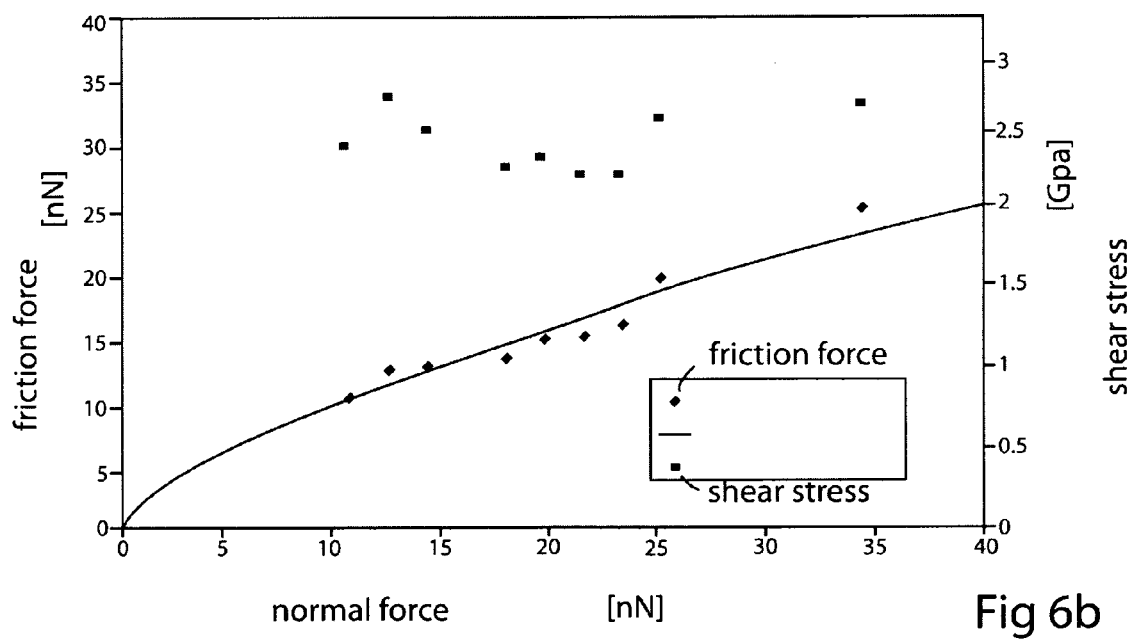

FIG. 6b shows the resulting friction force as a function of the normal force (diamond-shaped dots). With a known tip radius of 20 nm, the friction coefficient $\tilde{C}$ can be determined from a relation $$F_R = \tilde{C} R^{2/3} F_N^{2/3},$$

wherein R denotes a radius of the contact area and $F_N$ denotes a force normal to said contact area.

Furthermore, with a reduced Young's modulus of 100 GPa for a contact between an $Si_3N_4$ tip with mica and according to a relation $$\tilde{C} = \tau\pi\left(\frac{3}{4E^*}\right)^{2/3},$$

wherein E* denotes the reduced Young's modulus, the shear stress τ of the contact can be determined. The shear stress determined for individual measurement points is also depicted in FIG. 6b (square dots). As expected for a (theoretical) point contact the shear stress shows no dependence on the normal force. The average shear stress is 2.4 GPa and the average friction coefficient is equal to $\tilde{C}$=(0.29±0.02) $nN^{1/3}nm^{-2/3}$, wherein the error encompasses the statistical errors only. The friction force calculated for an idealistic point contact with said average friction coefficient according to a relation $$F_R = \tau\pi\left(\frac{3R}{4E^*}F_N\right)^{2/3}$$

is also shown in the diagram of FIG. 6b (solid line).

A preferred field of use of the device and the method in accordance with the present invention, respectively, concerns two-dimensional characterisation of heterogeneous systems.

Figure 7:
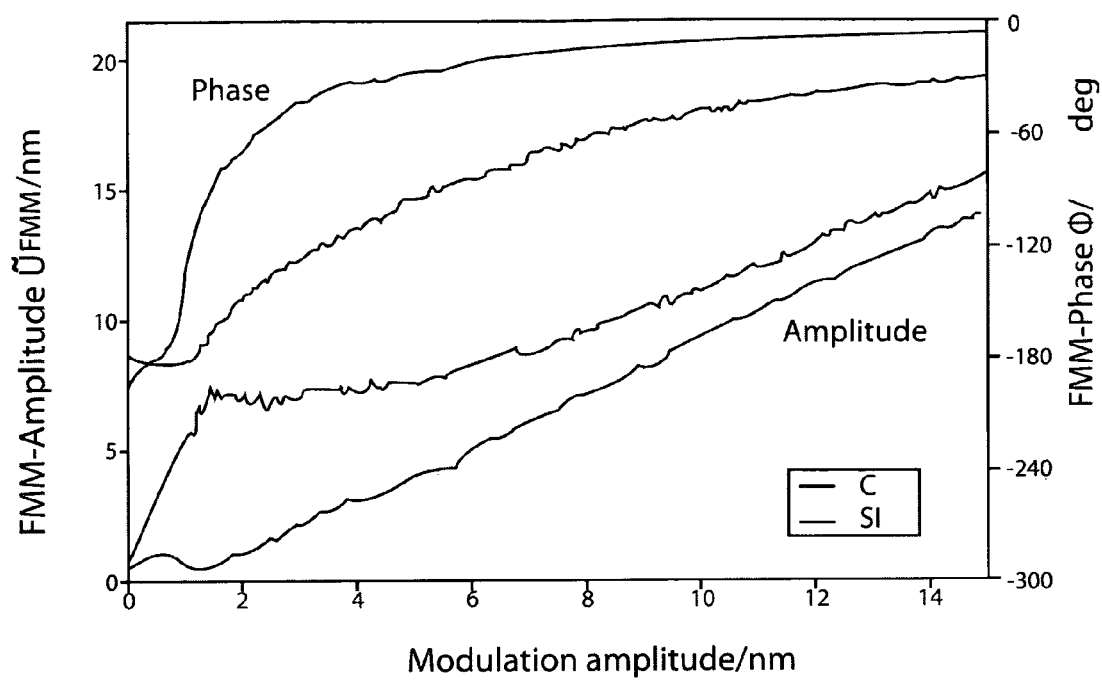
FIG. 7 is a diagram showing further measurement results obtained by means of a first embodiment of the method in accordance with the present invention.

FIG. 7 shows an FMM amplitude and a FMM phase spectrum obtained by using the device and method in accordance with the present invention in connection with a silicon (Si—) wafer covered with an native $SiO_2$ layer, on the surface of which pyrolytic carbon was deposited by means of chemical vapour deposition (CVD) in a hot-wall reactor at a temperature of 1100° C. for 90 minutes. A mixture of methane (10 Vol. %) and argon (90 Vol. %) at a total pressure of 100 kPa was used as reaction gas and was allow to flow over the sample after residence time in the reactor of approximately 0.06 s. In this way, islands of deposited carbon are formed on the Si-wafer. Appended FIG. 7 shows respective FMM amplitude spectra recorded on such an island (C) and on a spot of the substrate (SI). In both cases, the frictional part of the cantilever elastic force with respect to the total normal force was essentially identical and amounted to approximately 6 nN. The measured FMM amplitudes differ significantly in the range of small modulation amplitudes. While the curve measured on the silicon substrate shows pronounced sticking regime and plateau, a sticking regime is barely observable for the spectrum recorded on the carbon island. From the shown spectrum of FIG. 7, a friction force of $F_R$=1 nN–1.5 nN can be estimated. For the silicon substrate a friction force of $F_R$=10.3 nN can be determined.

Figure 8A:
FIGS. 8a-c are diagrams showing measurement results obtained by means of a second embodiment of the method in accordance with the present invention.
Figure 8B:
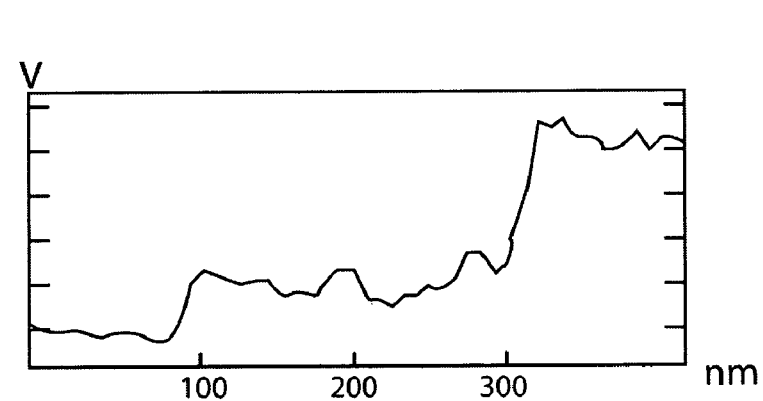
Figure 8C:
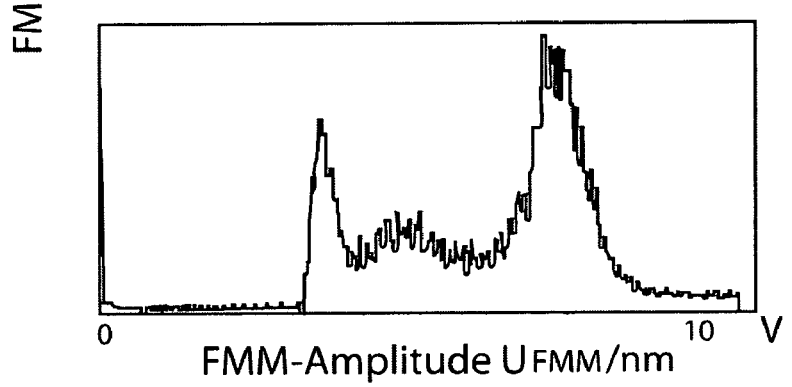

FIG. 8a shows further OFM measurement results of pyrolytically deposited carbon islands on a silicon substrate. Again, as in FIG. 7, the OFM mode is used for material characterisation. Modulation frequency was 500 Hz and the nominal modulation amplitude was 10 nm. In contrast to the OFM images of FIG. 7, the FMM amplitude measured on said islands, i.e. the dark spots traversed by dashed scanning line SL in FIG. 8a, does not fall into a common range. Two different types of island regions can be observed, which differ from each other with respect to their respective FMM amplitude signal. This particular feature can also be found in the profile of FIG. 8b (taken along the dashed line SL of FIG. 8a) in which two steps at 100 nm and approximately 300 nm are clearly distinguishable: At the transition of the island species with a lower FMM amplitude to the other island species (at 100 nm) the average FMM amplitude (measured here in absolute voltages) increases by approximately 1.5 V while the FMM amplitude does only vary a little within the region of one species. At the transition to the silicon substrate, another increase in FMM amplitude of about 4.5 V is observed (at about 300 nm). These two species show up again in the histogram of FIG. 8c, which gives a relative frequency of occurrence of the FMM amplitude measured for the entire region of FIG. 8a. The distribution shows between a sharp maximum at 3 V belonging to the FMM amplitude of the darker island parts and a maximum at 7.5 V originating from a silicon substrate a further maximum. Said maximum originates from those island parts, which show higher FMM amplitude. The higher FMM amplitude in these regions indicates a higher friction force.

In this way, the device and method as proposed in accordance with the present invention, respectively, can be employed to prove the existence of different chemical species, e.g. in the pyrolytic deposit. Furthermore, the above-described experiments prove the applicability of the OFM as a novel dynamical method for quantitative friction measurement. In addition to the inherent advantages of only small influence of conservative forces and topography to friction information and an enhanced signal stability owing to the use of Lock-In techniques, OFM does not need any additional instrumental prerequisites for implementing in commonly used AFMs owing to a modulation of the sample position in z-direction and at low frequencies as used for the conventional FMM and offers a good possibility for calibration of detected signal owing to use of a normal force channel.

In accordance with further embodiments of the device and method in accordance with the present invention, respectively, in the above-defined Low Amplitude Buckling Mode (LABM) said device and method can be used to determine a lateral contact stiffness of a contact formed between a measurement tip of a microscopic probe and a sample surface by means of normal modulation of the sample position.

As already stated above, the slope of measured FMM amplitude spectra in the sticking regime R1 (FIG. 5) and the detection sensitivity depend on the contact stiffness. In accordance with the present invention, this dependence forms the basis for a novel method for determining the contact stiffness, which consists in deriving the contact stiffness from a ratio of FMM amplitude to excitation amplitude in the sticking regime. However, in contrast to conventional FMM, a lateral deformation of the sample will be analysed. However, before discussing said embodiment of the method in accordance with the present invention in greater detail, the most important parameters shall be mentioned briefly:

In contrast to OFM, a smaller modulation amplitude in the sticking regime R1 (FIG. 5) must be chosen for LABM. Since contact stiffness can decrease due to partial sliding (micro slip) at a limit to the transition regime (R2), modulation amplitudes MA (FIG. 2) should be used, which do not exceed the maximum amplitude of the sticking regime. The FMM phase, which should be −180° in the case of complete sticking, can be used as an indicator for undue modulation amplitude.

In order to achieve a good detection sensitivity of LABM, the buckling force constant of the microscopic probe/cantilever s chosen of the same order as the lateral stiffness of the contact formed between measurement tip and the surface.

As for OFM, the modulation frequency is chosen to lie beneath any resonant frequencies of cantilever 2 and/or excitation system, i.e. distance modulating means 8, sample stage 5, the scanning motor means 20, etc. of the device according to FIG. 1.

From the measured amplitude spectra, from a slope in the sticking regime a sticking detection sensitivity of the device can be measured directly according to a relation $$k_{lat} = k_{yy} \frac{\frac{\xi_{haft}}{\kappa_{n,haft}(\tilde{\lambda}_0)} - \xi_{bend}}{\xi_z - \frac{\xi_{haft}}{\kappa_{n,haft}(\tilde{\lambda}_0)}}.$$

As can be shown from detailed model calculation, said sticking detection sensitivity depends on $k_{lat}$, which can be approximated by $$\xi_{haft} = \xi_{bend}\tilde{\xi}_{haft} = \xi_{bend} \frac{d\tilde{U}_{FMM}}{dA_z}\bigg|_{haft},$$

wherein $$\kappa_{n,haft}(\tilde{\lambda}_0) = 1 - \frac{\tilde{\lambda}_0 k_{yz}}{\alpha\left(\frac{k_{yz}}{\tilde{\lambda}_0} + k_y\right)}$$

$k_{yz}$ being a force constant element, i.e. force of the measurement tip in y-direction (cf. FIGS. 3a, b) for motion of the tip in z-direction, and $\tilde{\xi}_{haft}$ being a normalised sticking detection sensitivity, with $$\tilde{\lambda}_0 = \frac{\xi_{haft} - \xi_z}{\xi_y},$$

α here being a ratio of normal to lateral contact stiffness according to a relation:

$$\alpha = \frac{k_{lat}}{k_n} = \frac{4G^*}{E^*},$$

wherein $G^*$ denotes the (reduced) shear modulus.

Thus, owing to the connection between the sticking detection sensitivity and the lateral contact stiffness, $k_{lat}$, the LABM allows quantitative determining of elastical sample properties.

As a first experimental application of LABM, FMM amplitude spectra were measured on a spot of the above-described silicon sample (FIGS. 8a-c) not covered with carbon for different values of the normal force. The silicon material of the wafer is covered with an native layer of amorphous $SiO_2$, the thickness of which is of the order of 100 nm. Amorphous $SiO_2$ has a Young's modulus of 69-73 GPa.

Figure 9A:
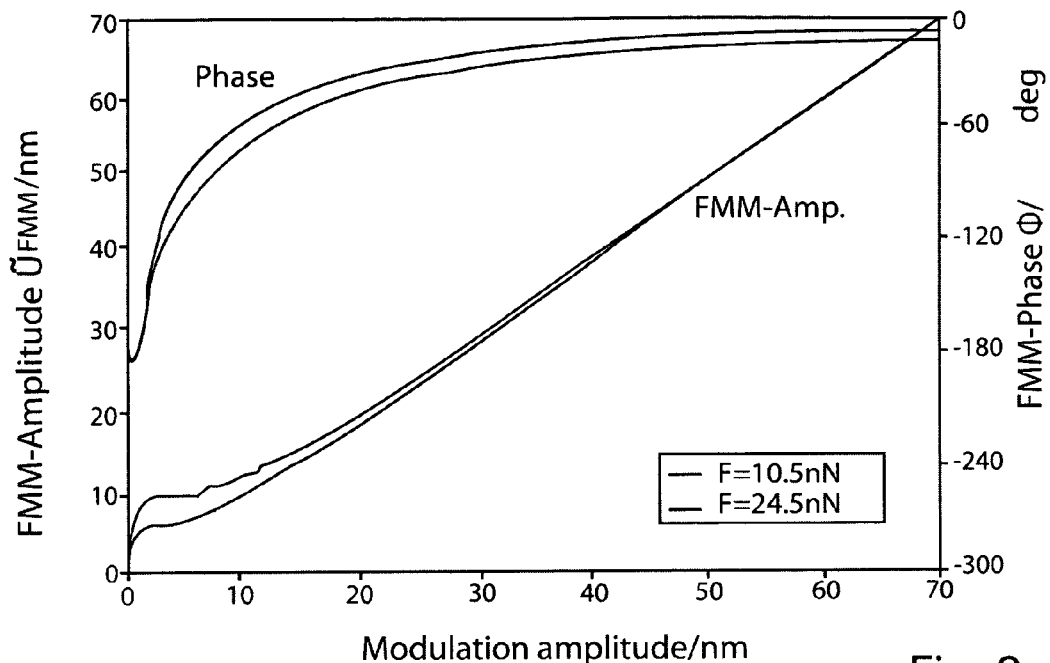
FIGS. 9a, b are diagrams showing measurement results obtained by means of a third embodiment of the method in accordance with the present invention.

FIG. 9a shows said FMM spectra, which were measured with sharpened Microlever™ C at a normal force of 10.5 nN and 24.5 nN, respectively. Adhesion forces between the measurement tip and the sample surface were approximately 12 nN. The spectra follow the above-mentioned theoretical behaviour (cf. FIG. 5) in an almost idealistic way, wherein calibration of the spectra was performed in the sliding regime R3 (FIG. 5). As previously described for OFM, the friction force can be determined from the plateau PL (FIG. 5) yielding values of 4.8 nN and 7.4 nN, respectively. Using the tip radius provided by the manufacturer of the cantilever, one obtains $\tilde{C}=0.136$ $nN^{1/3}nm^{-2/3}$ and $\tilde{C}=0.120$ $nN^{1/3}nm^{-2/3}$, respectively.

Figure 9B:
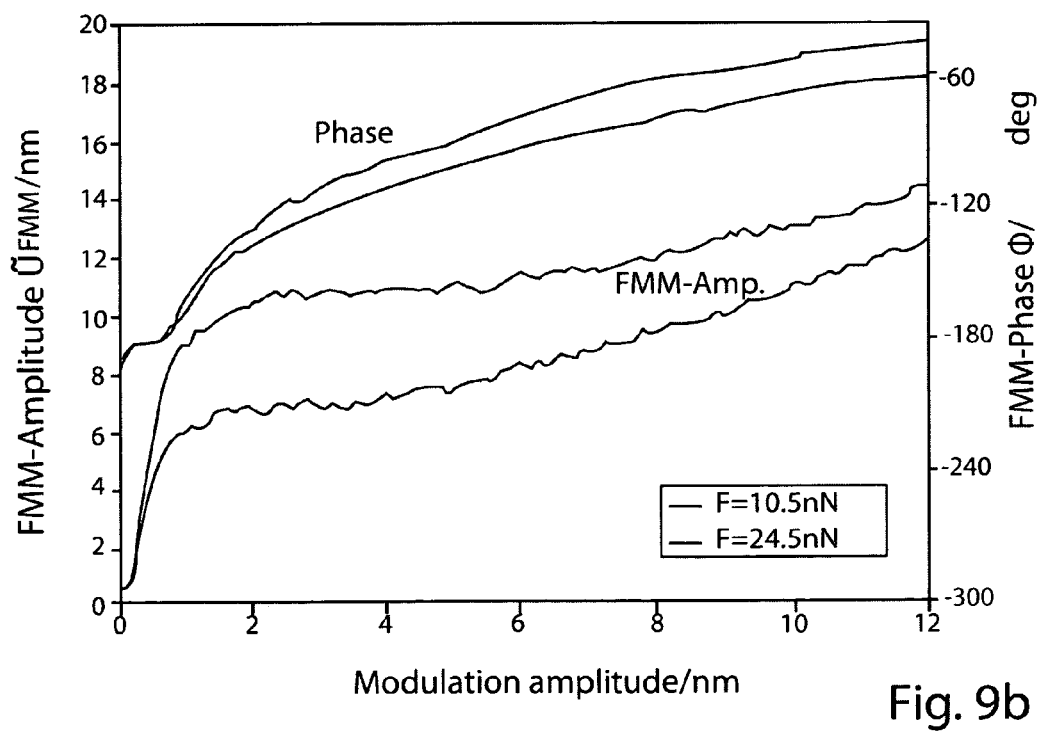

FIG. 9b is a detailed view of the range of small modulation amplitudes of the spectra of FIG. 9a. The larger slope of the FMM amplitude curve measured at greater normal force is easily observed. The higher slope corresponds to a measurably enhanced contact stiffness. Quantitative analysis yields an average slope of FMM amplitude as a function of modulation amplitude in the sticking regime of 11.35 and 13.35 for the smaller and the higher normal force, respectively. Taking into account an angle $\phi=17.5°$ (FIG. 1; FIG. 3a, b) between cantilever axis and sample plane yields a lateral contact stiffness of 144 N/m and 196 N/m, respectively. Computation of the stiffness ratio α was performed with an assumed Young's modulus of 72 GPa and a Poisson Number of 0.17 according to the above-defined equation, thus obtaining a value of 0.886. Using the tip radius of 20 nm, the contact stiffnesses derived from the spectra yield an Young's modulus of 69.1 GPa and 73.9 GPa, respectively, according to a relation $$k_n(F) = \sqrt[3]{6E^{*2}RF}.$$

This corresponds well with the expected literature value for amorphous $SiO_2$.

Using the Young's modulus derived from measurement as well as the computed friction forces, a shear strength of 0.70 GPa and 0.63 GPa can be calculated. These values are somewhat lower than corresponding values for the shear strength published elsewhere.

An important advantage of LABM arises from the fact that the lateral contact stiffness is comparable with the normal contact stiffness, while the buckling force constant of the microscopic probe/cantilever is greater by many orders of magnitude than the bending force constant of the microscopic probe/cantilever. In this way, it is possible to achieve high lateral forces with cantilevers which are comparably soft with respect to their bending force constant. Thus, lower normal forces can be achieved, which can be well characterised and which do not impair contact geometry, thus enabling study of harder sample materials, the Young's modulus of which can be of the same order of magnitude than an Young's modulus of the measurement tip. Therefore, changes of contact characteristics due to wearing of the measurement tip are not to be expected in the same extend as with other measurement techniques, e.g. Ultrasound Atomic Force Microscopy (UAFM). Possible use of conventional contact cantilevers with small bending force constants furthermore enables a sample-preserving scanning of the sample topography with the same cantilever used for measuring elastical properties owing to the low normal forces. In addition, due to general physical reasons hard cantilevers suffer from decreasing sensitivity to sense topography because of deformation of the contact formed between the measurement tip and the sample surface, if the normal contact stiffness is small in comparison with the bending force constant.

The use of relatively soft cantilevers and low normal forces does not only enable the study of hard samples. It can also be used advantageously for studying softer and damageable samples, e.g. polymeric samples such as latex colloid. Delicate samples of the above-mentioned kind cannot be scanned with harder cantilevers in contact mode.

Preferably, the above-described LABM measuring technique can be used with simultaneous scanning motion for two-dimensional sample characterisation.

In this way, LABM provides a novel method for determining local elastical sample properties by measuring lateral contact stiffness. Said method inherently possesses a number of advantages which are not known in combination from any other prior art method:

- Use of soft contact-cantilevers with low normal force constant, thus advantageously achieving low normal forces in connection with hard samples having a high Young's modulus as well as with soft damageable samples.
- No artefacts due to lateral forces and friction in connection with lateral motion of the measurement tip in y-direction.
- No additional instrumental requirements owing to modulation in z-direction only at low frequencies.
- Good calibration possibility of the detected signal owing to use of the normal force channel.

REFERENCES

[1] G. BINNIG, H. ROHRER, C H. GERBER, E. WEIBEL: *Surface Studies by Scanning Tunneling Microscopy*. Phys. Rev. Lett. 49 (1) 1982, S. 57-61.

[2] B. BHUSHAN: *Handbook of Micro/Nanotribology*, $2^{nd}$ Edn. CRC Press, Boca Raton, USA, 1999.

[3] H.-U. KROTIL, T H. STIFTER, O. MARTI: *Lock-in technique for concurrent measurement of adhesion and friction with the scanning force microscope*. Rev. Sci. Instrum. 72 (1) 2000, S. 150-156.

[4] J. COLCHERO, M. LUNA, A. M. BARO: *Lock-in technique for measuring friction on a nanometer scale*. Appl. Phys. Lett. 68 (1996) S. 2896.

[5] K. YAMANAKA, H. OGISIO, O. KOLOSOV: *Ultrasonic force microscopy for nanometer resolution subsurface imaging*. Appl. Phys. Left. 64 (1994) S. 178.

[6] V. SCHERER, W. ARNOLD, B. BHUSHAN: *Lateral force microscopy using acoustic friction force microscopy*. Surf. Interface Anal. 27 (1999) S. 578-587.

[7] H.-U. KROTIL, E. WEILANDT, T H. STIFTER, O. MARTI, S. HILD: *Dynamic Friction Force Measurements with the Atomic Force Microscope*. Surf. Interface Anal. 27 (1999), S. 341-347.

[8] P. MAIVALD, H. J. BUTT, S. A. C. GOULD, C. B. PRATER, B. DRAKE, J. A. GURLEY, V. B. ELINGS, P. K. HANSMA: *Using force modulation to image surface elasticities with the atomic force microscope*. Nanotechnology 2 (1991) S. 103-106.

[9] A. ROSA-ZEISER, E. WEILANDT, S. HILD, O. MARTI: *The simultaneous measurement of elastic and adhesive properties by scanning force microscopy: pulsed-force mode operation*. Meas. Sci. Technol. 8 (1997), S. 1333-1338.

[10] P.-E. MAZERAN, J.-L. LOUBET: *Normal and lateral modulation with a scanning force microscope, an analysis: implication in quantitative elastic and friction imaging*. Tribology Letters 7 (1999), S. 199-212.

[11] O. PIÉTREMENT, J. L. BEAUDOIN, M. TROYON: *A new calibration method of the lateral contact stiffness and lateral force using modulated lateral force microscopy*. Tribology Letters 7 (1999), S. 213-220.

[12] O. PIÉTREMENT, M. TROYON: *Quantitative elastic modulus measurement by magnetic force modulation microscopy*. Tribology Letters 9 (2000), S. 77-87.

[13] H.-N. LIN, T.-T. HUNG, E.-C. CHANG, S.-H. CHEN: *Force modulation microscopy study of phase separation on blend polymer films*. Appl. Phys. Lett 74 (1999) 19, S. 2785-2787.

[14] D. DEVECCHIO, B. BHUSHAN: *Localized surface elasticity measurements using an atomic force microscope*. Rev. Sci. Instrum. 68 (1997) 12, S. 4498-4505.

[15] S. AMELIO, A. V. GOLDADE, U. RABE, V. SCHERER, B. BHUSHAN, W. ARNOLD: *Measurement of elastic properties of ultra-thin diamond-like carbon coatings using atomic force acoustic microscopy*. Thin Solid Films 392 (2001) S. 75-84.

[16] K. YAMANAKA, S. NAKANO: *Quantitative elasticity evaluation by contact resonance in an atomic force microscope*. Appl. Phys. A 66 (1998) S. S313.

[17] F. DINELLI, M. R. CASTELL, D. A. RITCHIE, N. J. MASON, G. A. D. BRIGGS, O. V. KOLOSOV: *Mapping surface elastic properties of stiff and complaint materials on the nanoscale using ultrasonic force microscopy*. Phil. Mag. A 80 (2000), S. 2299.

[18] N. A. BURNHAM, A. J. KULIK, P. J. GALLO, G. GREMAUD, F. OULEVEY: *Scanning local-acceleration microscopy*. J. Vac. Sci. Technol. B. 14 (1996) S. 794.

[19] E. L. FLORIN, M. RADMACHER, B. FLECK, H. GAUB: *Atomic force microscope with magnetic force modulation*. Rev. Sci. Instrum. 65 (1994) S. 639.

[20] S. V. STEPNOWSKI, K. J. WAHL, W. N. UNERTL: *Viscoelastic effects in nanometer-scale contacts under shear*. Tribol. Lett. 5 (1998) S. 103.

The invention claimed is:

1. A method of determining or contrasting material properties of a contact formed between a measurement tip of a microscopic probe and a sample surface of a sample material, wherein a distance modulation is applied for modulating a distance between a support of the microscopic probe and the sample surface in a direction essentially normal to the sample surface and wherein a normal force signal is measured and demodulated, wherein said material properties are determined using data comprised in the normal force signal and related to a buckling deformation of the microscopic probe relative to and away from the sample surface and wherein a modulation amplitude of the distance modulation is controlled such that the measurement tip is at least temporarily in a sticking regime with respect to the sample surface and that in said sticking regime local elastic and/or viscoelastic properties of the sample surface at the measurement tip are determined from a buckling contribution to the normal force signal.

2. The method of claim 1, wherein said buckling deformation of the microscopic probe is identified from a relative phase of the normal force signal and said distance modulation.

3. The method of claim 1, wherein said distance modulation is a periodical modulation.

4. The method of claim 1, wherein a lateral scanning motion of the microscopic probe is performed in a direction essentially parallel to the sample surface and in parallel with the normal distance modulation.

5. The method of claim 1, wherein said deformation of the microscopic probe is determined by means of a Lock-In technique.

6. The method of claim 1, wherein an amplitude of said distance modulation is determined by controlling a relative phase of said normal force signal and said distance modulation to lie within a range of $-140°$ to $-90°$.

7. The method of claim 1, wherein a friction force, $F_R$, of said contact is determined from a measured normal force signal according to a relation:

$$F_R = -K_Y \cdot \frac{\zeta_{bend}}{\zeta_y} \cdot \frac{T_c}{P} \cdot \tilde{U}_{FMM}$$

wherein $k_y$ is a buckling force constant of the microscopic probe $\zeta_{bend}$ is an angular detection sensitivity of the microscopic probe, $\zeta_y$ is a buckling detection sensitivity, $T_c$ is a correction term close to unity, p is a numeric correction factor dependent on detection sensitivities and close to 1.1, and wherein $\tilde{U}_{FMM}$ is a normalized measured amplitude of the normal force.

8. The method of claim 1, wherein a modulation amplitude of the distance modulation is controlled by restraining a relative phase of the normal force signal and the distance modulation to a value essentially equal to $-180°$.

9. The method of claim 1, wherein said normal force is measured repeatedly for respective different values of a normal force of the microscopic probe on the sample surface.

10. A control/analysis unit for use in a microscopic measurement device, said device providing a normal force signal indicative of a normal force effective on a microscopic probe when said microscopic probe is in contact with a sample surface and a distance between the sample surface and a support of the microscopic probe is being modulated, said control/analysis unit being adapted to perform the method according to claim 1.

11. A computer program product, comprising program code sequences adapted to implement and/or perform the method according to claim 1, when executed in a control/analyzing unit of a microscopic measurement device providing a normal force signal indicative of a normal force effective on a microscopic probe when said microscopic probe is in contact with a sample surface and a distance between the sample surface and a support of the microscopic probe is being modulated.

12. A device for determining material properties of a contact formed between a measurement tip of a microscopic probe and a sample surface of a sample material, comprising:
said microscopic probe,
a sample stage adapted to hold said sample material, distance modulating means adapted to modulate a distance between said sample stage and a support of said microscopic probe, a force sensing means adapted to determine a normal force effective on said microscopic probe from a deformation of said microscopic probe and to provide a normal force signal indicative of said normal force, control/analyzing unit operatively connected with at least said distance modulating means and adapted to demodulate the normal force signal and to determine said material properties from the demodulated normal force signal, wherein the microscopic probe has a low buckling force constant ($k_y$) satisfying a relation:

$$k_y < k_{lat},$$

wherein $k_{lat}$ is a lateral stiffness of said contact; and wherein said control/analyzing unit is adapted to perform a method of determining or contrasting material properties of a contact formed between the measurement tip of the microscopic probe and the sample surface of the sample material, wherein a distance modulation is applied for modulating the distance between the support of the microscopic probe and the sample surface in a direction essentially normal to the sample surface and wherein the normal force signal is measured and demodulated, wherein said material properties are determined using data comprised in the normal force signal and related to a buckling deformation of the microscopic probe relative to and away from the sample surface.

13. The device of claim 12, wherein the microscopic probe is a cantilever.

14. The device of claim 12, wherein a longitudinal axis of the microscopic probe is oriented with an angle in a range of 50 to 350 with respect to the sample surface.

15. The device of claim 12, wherein the measurement tip has an essentially spherical shape.

16. The device of claim 12, wherein a length (L) of the microscopic probe and a height (H) of the measurement tip satisfy a relation:

$$H \ll 1.$$

17. A method of determining or contrasting material properties of a contact formed between a measurement tip of a microscopic probe and a sample surface of a sample material, wherein a distance modulation is applied for modulating a distance between a support of the microscopic probe and the sample surface in a direction essentially normal to the sample surface and wherein a normal force signal is measured and demodulated, wherein said material properties are determined using data comprised in the normal force signal and related to a buckling deformation of the microscopic probe relative to and away from the sample surface and wherein a modulation amplitude of the distance modulation is controlled such that the measurement tip is at least temporarily in a sliding regime with respect to the sample surface and that in said sliding regime tribological properties of the contact are determined from a buckling contribution to the normal force signal.

18. A method of determining or contrasting material properties of a contact formed between a measurement tip of a microscopic probe and a sample surface of a sample material, wherein a distance modulation is applied for modulating a distance between a support of the microscopic probe and the sample surface in a direction essentially normal to the sample surface and wherein a normal force signal is measured and demodulated, wherein said material properties are determined using data comprised in the normal force signal and related to a buckling deformation of the microscopic probe relative to and away from the sample surface and wherein a frequency of said distance modulation is controlled to be different from a frequency of mechanical resonance of at least one of the microscopic probe, the support of the microscopic probe, a holding means used for holding the sample material, and a modulating means used for modulating the distance between said probe holder and the surface of the sample material.

19. A method of determining or contrasting material properties of a contact formed between a measurement tip of a microscopic probe and a sample surface of a sample material, wherein a distance modulation is applied for modulating a distance between a support of the microscopic probe and the sample surface in a direction essentially normal to the sample surface and wherein a normal force signal is measured and demodulated, wherein said material properties are determined using data comprised in the normal force signal and related to a buckling deformation of the microscopic probe relative to and away from the sample surface and wherein a frequency of said distance modulation is controlled to be in accordance with a frequency of mechanical or an electromechanical resonance of at least one of the microscopic probe, the support of the microscopic probe, a holding means used for holding the sample material, a modulating means used for modulating the distance between said probe holder and the surface of the sample material, and a coupled system comprising several of the said components of the device.

20. A method of determining or contrasting material properties of a contact formed between a measurement tip of a microscopic probe and a sample surface of a sample material, wherein a distance modulation is applied for modulating a distance between a support of the microscopic probe and the sample surface in a direction essentially normal to the sample surface and wherein a normal force signal is measured and demodulated, wherein said material properties are determined using data comprised in the normal force signal and related to a buckling deformation of the microscopic probe relative to and away from the sample surface and wherein at least part of the sample surface is scanned by means of the microscopic probe for different amplitudes of said distance modulation.

21. A method of determining or contrasting material properties of a contact formed between a measurement tip of a microscopic probe and a sample surface of a sample material, wherein a distance modulation is applied for modulating a distance between a support of the microscopic probe and the sample surface in a direction essentially normal to the sample surface and wherein a normal force signal is measured and demodulated, wherein said material properties are determined using data comprised in the normal force signal and related to a buckling deformation of the microscopic probe relative to and away from the sample surface and wherein an amplitude of said distance modulation is controlled to lie in a regime of an essentially constant normal force signal, said normal force being a function of said modulation amplitude.

22. A device for determining material properties of a contact formed between a measurement tip of a microscopic probe and a sample surface of a sample material, comprising:
said microscopic probe,
a sample stage adapted to hold said sample material,
distance modulating means adapted to modulate a distance between said sample stage and a support of said microscopic probe,
a force sensing means adapted to determine a normal force effective on said microscopic probe from a deformation of said microscopic probe and to provide a normal force signal indicative of said normal force, a control/analyzing unit operatively connected with at least said distance modulating means and adapted to demodulate the normal force signal and to determine said material properties from the demodulated normal force signal, wherein the microscopic probe has a buckling force constant ($k_y$) satisfying the relation:

$$k_y \approx k_{lat},$$

wherein $k_{lat}$ is a lateral stiffness of said contact; and wherein said control/analyzing unit is adapted to perform a method of determining or contrasting material properties of a contact formed between the measurement tip of the microscopic probe and the sample surface of the sample material, wherein a distance modulation is applied for modulating the distance between the support of the microscopic probe and the sample surface in a direction essentially normal to the sample surface and wherein the normal force signal is measured and demodulated, wherein said material properties are determined using data comprised in the normal force signal and related to a buckling deformation of the microscopic probe relative to and away from the sample surface.

* * * * *

UNITED STATES PATENT AND TRADEMARK OFFICE
CERTIFICATE OF CORRECTION

PATENT NO. : 7,810,382 B2  Page 1 of 1
APPLICATION NO. : 11/883900
DATED : October 12, 2010
INVENTOR(S) : Schimmel et al.

It is certified that error appears in the above-identified patent and that said Letters Patent is hereby corrected as shown below:

In Column 29, line 8, before "control/analyzing", please insert: --a--.

In Column 29, line 39, please change "H<<1" to correctly read:

-- $\frac{H}{L} <<1$ --.

Signed and Sealed this

Thirtieth Day of November, 2010

David J. Kappos
*Director of the United States Patent and Trademark Office*